(12) United States Patent
Kim et al.

(10) Patent No.: US 9,104,239 B2
(45) Date of Patent: Aug. 11, 2015

(54) DISPLAY DEVICE AND METHOD FOR CONTROLLING GESTURE FUNCTIONS USING DIFFERENT DEPTH RANGES

(75) Inventors: Taehyeong Kim, Seoul (KR); Sangki Kim, Seoul (KR); Soungmin Im, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 756 days.

(21) Appl. No.: 13/043,953

(22) Filed: Mar. 9, 2011

(65) Prior Publication Data

US 2012/0229377 A1 Sep. 13, 2012

(51) Int. Cl.
*G06F 3/01* (2006.01)
(52) U.S. Cl.
CPC .................................. *G06F 3/017* (2013.01)
(58) Field of Classification Search
CPC  G06F 3/017; G06F 3/0346; G06F 2203/0331
USPC ........................................................ 345/157
See application file for complete search history.

(56) References Cited

U.S. PATENT DOCUMENTS

| 2002/0064382 | A1* | 5/2002 | Hildreth et al. | 396/100 |
| 2006/0182346 | A1 | 8/2006 | Yoda et al. | |
| 2008/0062257 | A1* | 3/2008 | Corson | 348/47 |
| 2008/0273755 | A1* | 11/2008 | Hildreth | 382/103 |
| 2009/0077501 | A1 | 3/2009 | Partridge et al. | |
| 2009/0288005 | A1* | 11/2009 | Stapleton et al. | 715/711 |
| 2010/0134409 | A1* | 6/2010 | Challener et al. | 345/156 |
| 2011/0193939 | A1* | 8/2011 | Vassigh et al. | 348/46 |

FOREIGN PATENT DOCUMENTS

KR  2001-0063788 A  7/2001

* cited by examiner

*Primary Examiner* — Chanh Nguyen
*Assistant Examiner* — John Kirkpatrick
(74) *Attorney, Agent, or Firm* — Birch, Stewart, Kolasch & Birch, LLP

(57) ABSTRACT

Provided are a display device and a method for controlling the same. The display device comprises a display unit, and a controller configured to perform predetermined functions according to a distance with a external object in response to an identical gesture made by the external object.

16 Claims, 26 Drawing Sheets

DISPLAY DEVICE AND METHOD FOR CONTROLLING GESTURE FUNCTIONS USING DIFFERENT DEPTH RANGES

BACKGROUND

1. Field

This document relates to a display device and a method for controlling the same using a virtual touch screen region.

2. Related Art

An interactive TV (ITV) is a television set that allows viewers to interact with the television content. Viewers interact with ITVs in a manner totally different from a typical way of controlling a TV or a video player, through remote-control devices. The ITV enables viewers to do various tasks without the aid of those devices. For example, viewers could use a typical ITV to select a movies stored in a central movie storage system, to play video games in a central server, to shop at home, to do their banking, and even to vote. This function of the typical ITV can be used to instantly collect viewers' reactions or opinions.

In order to interact with viewers, the typical display device uses a two dimensional (2D) camera. The 2D camera recognizes an object, such as a viewer or a device, from the background. Using a complicated analysis process, the 2D camera generates 2D data which is then processed to distinguish the images of objects from the background. It has been very difficult to identify objects, such as a viewer's hand, from the background and to track the movement of the identified object.

Because of these difficulties, a typical ITV has been manufactured to include a control device such as an actuator, a keyboard, or a joystick, which helps the user interact with the ITV.

Therefore, there is a need of eliminating the control device in order to maximize the ITV's function and provide an effective interactive TV service while accurately controlling the interaction between the display device and a user.

SUMMARY

The invention relates, in one embodiment, to a display device comprising a display unit and a controller. The controller is configured to perform predetermined functions according to a distance with an external object in response to an identical gesture made by the external object.

The invention relates, in other embodiments, to a display unit and a controller configured to control predetermined subjects according to a distance with an external object. wherein the controller controls a predetermined item displayed on the display unit when the distance with the external object is a first distance, and the controller controls a cursor displayed on the display unit when the distance with the external object is a second distance, and wherein the distance with the external object is a distance from the display unit to the external object.

The invention relates, in another embodiments, to a display device comprising a camera configured to capture an image of an external object; and a controller configured to provide predetermined feedback using at least one of a visual sense, an acoustic sense, and a tactile sense according to the distance with the external object where the external object is a distance from the camera to the external object.

The invention relates, in another embodiments, to a method for controlling a display device, comprising capturing a predetermined gesture of an external object; obtaining depth information of the external object; and performing predetermined functions according to a distance from a display unit to the external object, wherein a first function is performed for the predetermined gesture when the external object is located at a first distance, wherein a second function is performed for the predetermined gesture when the external object is at a second distance, and wherein the second distance is longer than the first distance, and the first function is different from the second function.

According to an exemplary embodiment of the present invention, a user can effectively control a virtual user interface by setting a plurality of virtual regions between an object such as the user and a display device.

According to an exemplary embodiment of the present invention, different functions are performed according to a distance between the external object (or external object generating gestures that could interact with the display device) and the display device. Accordingly, erroneous operations caused by a gesture of an object such as a user can be eliminated.

According to an exemplary embodiment of the present invention, a state of sensing a touch gesture of an object in a virtual user interface region is being feedback to a user according to a distance to the object. Accordingly, the touch gesture can be effectively sensed.

BRIEF DESCRIPTION OF THE DRAWINGS

The accompany drawings, which are included to provide a further understanding of this document and are incorporated on and constitute a part of this specification illustrate embodiments of this document and together with the description serve to explain the principles of this document.

FIG. 1 illustrates a display device to which the present invention is applied to.

DETAILED DESCRIPTION

The embodiments of the present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, a display device relating to the present invention will be described below in more detail with reference to the accompanying drawings. In the following description, suffixes "module" and "unit" are given to components of the display device in consideration of only facilitation of description and do not have meanings or functions discriminated from each other.

The display device described in the specification can include a television such as a DTV, a smart television, a digital broadcasting terminal, a personal digital assistants (PDA), a portable multimedia player (PMP), and/or a navigation system and so on.

Figure 1:
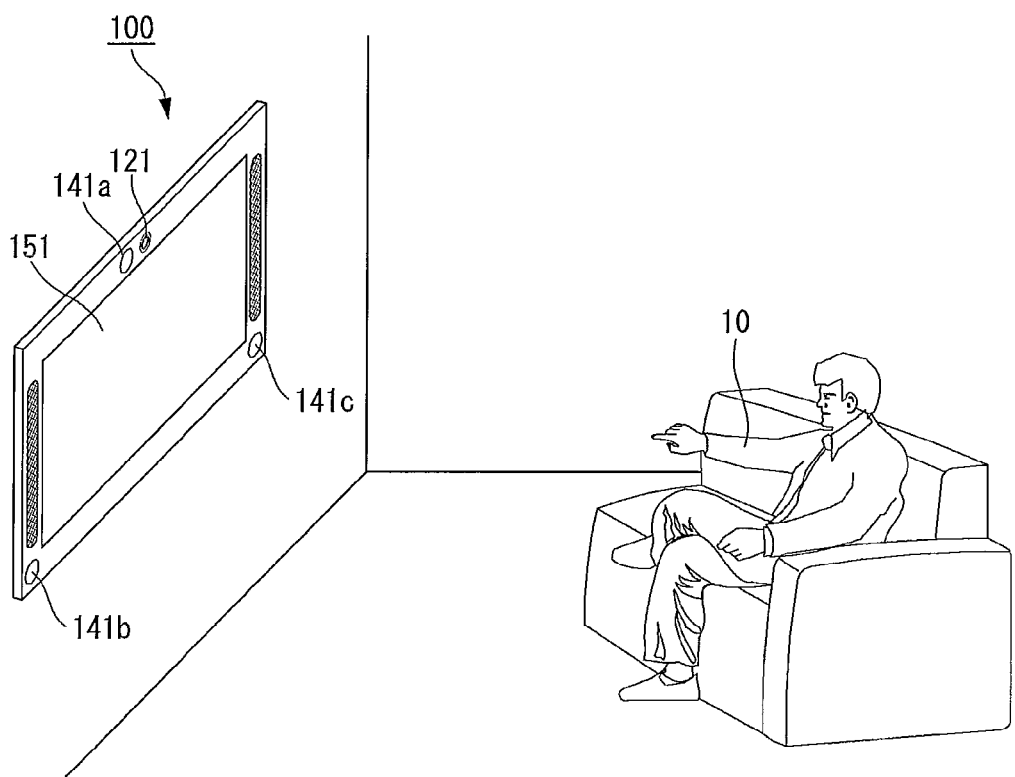

FIG. 1 illustrates a display device to which embodiments of the present invention are preferably applied.

Referring to FIG. 1, a display device 100 may be a TV having a distance-measuring module and display unit 151. The distance-measuring module measures a distance from the display device 100 to an external object such as a viewer's hand or a controlling device. The distance-measuring module may be a camera 121 or three dimensional (3D) multi-sensors 141*a*, 141*b*, and 141*c*. In the present disclosure, a distance between the external object and the distance-measuring module or the display unit/device is also referred to herein as a depth or a depth relationship.

When an object 10 (external object) enters a predetermined region in front of the display device 100, the display device 100 may recognize such entry of the object 10 as a gesture of touching the display device 100.

In order to recognize an entry, the display device 100 may include at least one a camera 121 and 3D multisensors 141*a*, 141*b*, and 141*c* to measure the distance to the object 10 or to calculate a coordinate of the object 10. The camera 121 and the multi-sensors 141*a*, 141*b*, and 141*c* will be described in later with a block diagram of the display device 100.

In FIG. 1, the display device 100 is a television set. The method for controlling a display device according to the present embodiment may be applied to any electronic devices having the distance-measuring module that measures the distance between a display device and an external object located in front of the display device. For example, the display device may be a smart phone, a laptop computer, a digital broadcasting signal receiving terminal, a personal digital assistants (PDA), a portable multimedia player (PMP), and/or a navigation system.

Figure 2:
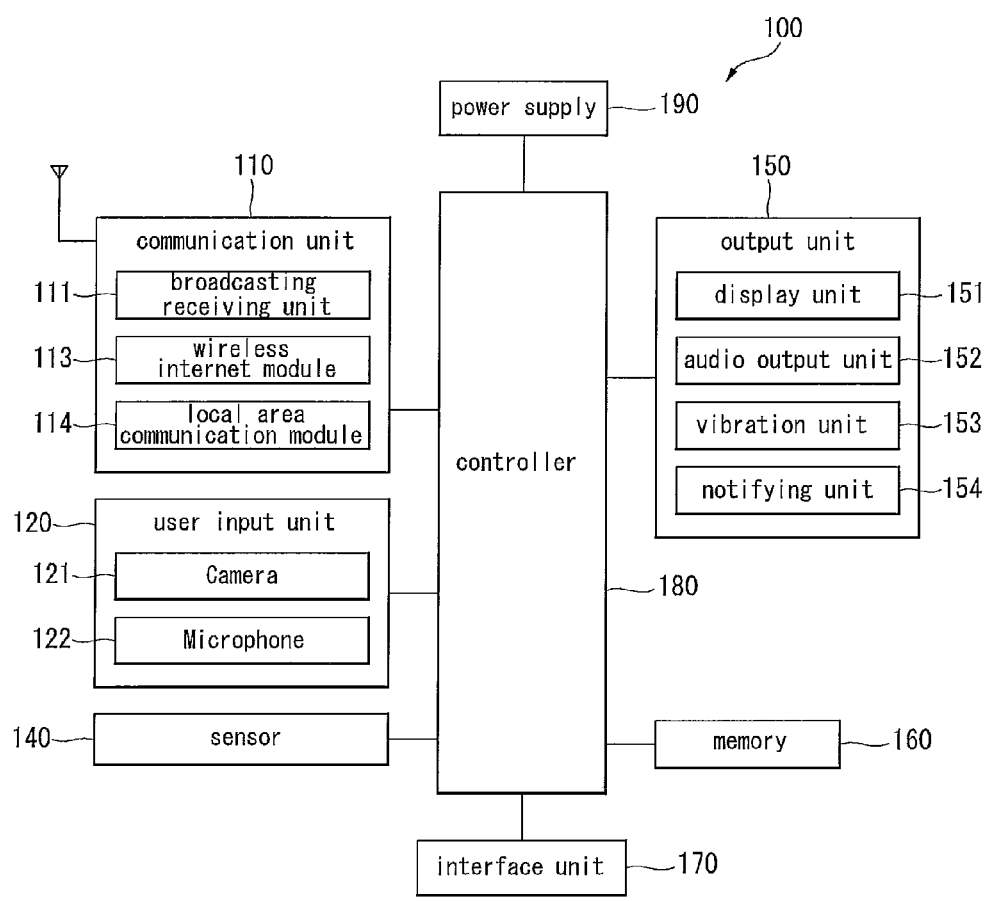
FIG. 2 is a block diagram illustrating a display device according to an exemplary embodiment of the present invention.

FIG. 2 is a block diagram illustrating an example of a display device according to an exemplary embodiment of the present invention.

The display device 100 may comprise a communication unit 110, a user input unit 120, a sensor 140, an output unit 150, a memory 160, an interface unit 170, a controller 180, and a power supply 190, all operatively coupled. FIG. 2 shows one example of a display device to which the present invention may be applied. Accordingly, the present invention is not limited thereto.

The communication unit 110 comprises at least one module that enables radio communication between the display device 100 and a radio communication system or between the display device 100 and a network in which the display device 100 is located. For example, the communication unit 110 may comprise a broadcasting receiving unit 111, a wireless Internet module 113 and a local area communication module 114.

The broadcasting receiving unit 111 receives broadcasting signals and/or broadcasting related information from an external broadcasting management server through a broadcasting channel.

The broadcasting channel comprises a satellite channel and a terrestrial channel. The broadcasting management server can be a server that generates and transmits broadcasting signals and/or broadcasting related information or a server that receives previously generated broadcasting signals and/or broadcasting related information and transmits the broadcasting signals and/or broadcasting related information to a terminal. The broadcasting signals comprise not only television broadcasting signals, radio broadcasting signals, and data broadcasting signals but also signals in a form of a combination of a television broadcasting signal and a radio broadcasting signal.

The broadcasting related information can be information on a broadcasting channel, a broadcasting program, or a broadcasting service provider. The broadcasting related information can be provided even through a communication network. In this case, the broadcasting related information can be received by the communication module.

The broadcasting related information may exist in various forms. For example, the broadcasting related information may exist in a form of an electronic program guide (EPG) of digital multimedia broadcasting (DMB) or in a form of an electronic service guide (ESG) of digital video broadcast-handheld (DVB-H).

The broadcasting receiving unit 111 receives broadcasting signals using various broadcasting systems. Particularly, the broadcasting receiving unit 111 can receive digital broadcasting signals using digital broadcasting systems such as digital multimedia broadcasting-terrestrial (DMB-T), digital multimedia broadcasting-satellite (DMB-S), media forward link only (MediaFLO), DVB-H and integrated services digital broadcast-terrestrial (ISDB-T) systems. The broadcasting receiving unit 111 can be constructed to be suited to broadcasting systems providing broadcasting signals other than the above-described digital broadcasting systems.

The broadcasting signals and/or broadcasting related information received through the broadcasting receiving unit 111 can be stored in the memory 160.

The wireless Internet module 113 is a module for wireless Internet access and can be comprised in the display device 100 or externally attached to the display device 100.

The local area communication module 114 is a module for local area communications. Bluetooth, radio frequency identification (RFID), infrared data association (IrDA), ultra wideband (UWB), and ZigBee can be used as a local area communication technique.

Referring to FIG. 2, a user input unit 120 is used to input an audio signal or a video signal and comprises a camera 121 and a microphone 122. The camera 121 processes moving images obtained by an image sensor in a video telephony mode or a photographing mode. The processed image frames can be displayed on a display unit 151.

The image frames processed by the camera 121 can be stored in the memory 160 or transmitted to an external device through the radio communication unit 110. The display device 100 may comprise at least two cameras according to a constitution of the terminal.

The camera 121 may be integrally provided with the display device 100 and capture gestures of a viewer or the camera 121 may be externally attached to the display device 100 and transmit captured images to the display device 100.

The camera 121 may be formed with at least two cameras according to a configuration of a terminal.

Furthermore, the camera 121 can perform two-dimensional or three-dimensional photographing and may be formed as a two-dimensional camera, a three-dimensional camera, or a combination of a two-dimensional camera and a three-dimensional camera.

The camera 121 may be a 3D camera for capturing 3D images. For example, the camera 121 may be a stereoscopic camera, a time of flight (TOF) camera, or an infrared-rays camera.

The stereoscopic camera captures a 3D image using two lenses separated at a predetermined distance. The two lenses interact with each other in order to focus and expose the image. The stereoscopic camera captures a 3D image using a view point difference of two lenses.

Since the stereoscopic camera captures an image using two lenses, the captured images will show binocular disparity. That is, the same object is located at different positions in images captured by two lenses. By extracting such disparity from the captured images, the distance to an external object can be measured.

The TOF camera obtains a 3D image by measuring the time it takes the light to reach an object and reflect it back to the TOF camera. When an external object is farther away from the camera a propagation time of the emitted light is longer than when the object is nearer and the propagation time of the emitted light is shorter. The distance to an object can be measured by calculating a propagation time of light. The TOF camera includes a light-emitting device that emits a light to an object.

The infrared-rays camera may be used to obtain information about an object's depth. The infrared-rays camera radiates infrared-rays to an external object, extracts a value of the radiated infrared-rays at the location of the external object, and extracts depth information from the radiated infrared-rays value.

The microphone 122 receives an external audio signal in a recording mode, or a voice recognition mode and processes the received audio signal into electric audio data. The microphone 122 can employ various noise removal algorithms for removing the noise generated when the external audio signal is received.

The sensor 140 may comprise 3D multi-sensors (e.g., 141a, 141b, and 141c of FIG. 1). The display device 100 can obtain the distance to an external object 10 using the multi-sensors. The 3D multisensors 141a, 141b, and 141c can detect 2D location information or 3D location information of an external object such as a finger or a stylus pen within a predetermined distance. That is, the 3D multisensors 141a, 141b, and 141c can detect a location (e.g., x-y coordinate) on a display unit 151 or a vertical distance (z coordinate) from the display unit 151. The 3D multisensors may be ultrasonic sensors, infrared sensors, capacitive-type touch screens, and/or image sensors. Locations and motions of external objects can be found using the 3D multisensors.

The output unit 150 comprises a display unit 151, an audio output unit 152, and a vibration unit/module 153.

The display unit 151 displays information processed by the display device 100. For examples, the display unit 151 displays UI or graphic user interface (GUI) related to a displaying image. The display unit 151 displays a captured or/and received image, UI or GUI when the display device 100 is in the video mode or the photographing mode.

The display unit 151 comprises at least one of a liquid crystal display, a thin film transistor liquid crystal display, an organic light-emitting diode display, a flexible display, and a three-dimensional display.

The audio output unit 152 can output audio data received from the communication unit 110 or stored in the memory 160 in an audio signal receiving mode and a broadcasting receiving mode. The audio output unit 152 outputs audio signals related to functions performed in the display device 100. The audio output unit 152 may comprise a receiver, a speaker, a buzzer, etc.

The vibration module 153 outputs a vibration signal for indicating generation of an event of the display device 100. Examples of events generated in the display device 100 comprise reception of user's gesture, etc.

The vibration module 153 may generate vibration with a predetermined frequency that causes a viewer to have touch sensation by a predetermined pressure. The vibration module 153 may generate predetermined vibration pattern corresponding to a predetermined input to which the display unit 151 reacts. For example, the predetermined input may be a predetermined gesture command or an event performed corresponding to a coordinate of an external object. The predetermined frequency may be a ultrasonic wave. Furthermore, the vibration pattern may be a vibration pattern of the ultrasonic wave.

The vibration module 153 may generate distinct vibration patterns that are set according to the distance between the display device 100 and an external object. The distance from the display device 100 to the external object may be divided into a plurality of virtual regions that can be distinguished from others between the displace device 100 and the external object. For example, a vibration pattern assigned to a first virtual region may be set differently from a vibration pattern assigned to a second virtual region or a third virtual region. A viewer feels different vibration patterns made by the vibration module 153 according to the virtual regions when the viewer makes a push gesture. The viewer can intuitively determine which of virtual regions a viewer touches with his or her finger tip based on the experienced vibration pattern.

A notifying unit 154 outputs a signal for notifying event generation of the display device 10. For example, the event generated by the display device 100 may be an input of a predetermined gesture input from an external object located front the display unit 151. A video signal or an audio signal may be output through the display unit 151 or the audio output unit 152. The notifying unit 154 may generate sound effects that are set differently according to the distance to the external object. For example, a sound effect assigned to the first virtual region may be different that sound effects assigned to the second and third virtual regions. Accordingly, when a viewer makes a push gesture in the front of the display device 100, the viewer may intuitively determine which of virtual regions a user is touching based on the sound effect.

The memory 160 can store a program for the operation of the controller 180 and temporarily store input/output data (for example, a broadcasting program, messages, still images, and moving images). The memory 160 can also store data about the sound effects and vibration patterns that are outputted when the external object makes a push gestures. The data are distance-specific output values different according to a virtual region where the object is located. Such vibration patterns and sound effects may have different patterns according to a property of a predetermined area where the external object is located.

The memory 160 can comprise at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM), a magnetic memory, a magnetic disk, and an optical disk. The display device 100 can operate in relation to a web storage performing a storing function of the memory 160 on the Internet.

The interface unit 170 serves as a path for all external devices connected to the display device 100. The interface unit 170 receives data from the external devices or power and transmits the data or power to the internal components of the display device 100, or transmits data of the display device 100 to the external devices. The interface unit 170 may comprise, for example a wired/wireless headset port, an external charger port, a wired/wireless data port, a memory card port, a port for connecting a device having a user identification module, an audio I/O port, a video I/O port, and an earphone port.

The interface unit 170 serves as a path for supplying power from an external cradle to the display device 100 when the display device 100 is connected to the external cradle, or a path for supplying various command signals inputted by the user to the display device 100 through the cradle. The various command signals or power input from the cradle can be used as a signal for determining whether the display device 100 is accurately set to the cradle.

The controller 180 controls the overall operations of the display device 100 based on the distance to the external object and based on movements of the external object in order to enable the external object to interact with various items and digital objects displayed on the display unit 151.

The controller 180 may comprise an image processor that obtains depth information from an image of the external object by processing the image captured through the camera 121. The controller 180 may also perform a pattern-detecting function that detects gestures or drawing motions made in a predetermined virtual region front the display device 100 and recognizes such detected motions as a predetermined gesture command or an image through the image processor.

The controller 180 can be aware of the distance between the display device 100 and the external object by obtaining information on a distance to the external object through the sensor 140, for example, a Z-coordinate of the external object.

When the external object makes the same gesture at different locations, the controller 180 may perform different functions according to the location of the external object.

Also, the controller 180 can control a target subject according to a location (or a distance) of an external object that makes a gesture. For example, when the external object is located outside a virtual touch screen region, the controller 180 may control a cursor on the display unit 151. When the external object is located inside the virtual touch screen, the controller 180 may select various items on the display unit 151 and perform corresponding events according to the selected items.

The controller 180 may comprise a multimedia module with the image processor. The multimedia module may process a signal for reproducing multimedia data.

The power supply unit 190 receives external power and internal power and provides power required for the operations of the components of the display device 100 under the control of the controller 180.

Various implementations of this document can be implemented in a computer or similar device readable recording medium using software, hardware, or a combination thereof, for example.

According to a hardware method, the implementations of this document can be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for executing functions. In some cases, the implementations can be implemented by the controller 180.

According to a software method, implementations such as procedures or functions can be implemented with a separate software module executing at least one function or operation. Software codes can be implemented according to a software application written in an appropriate software language. Furthermore, the software codes can be stored in the memory 160 and executed by the controller 180.

Figure 3:
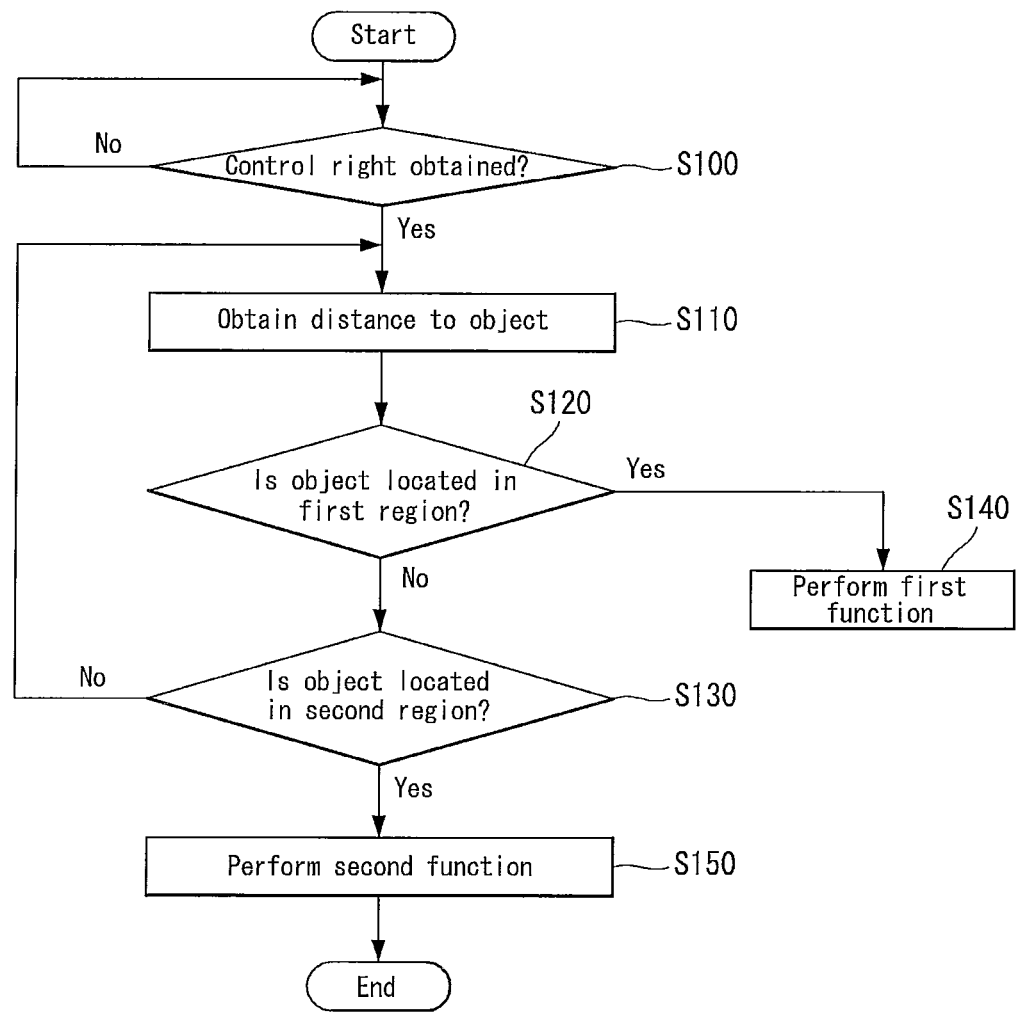
FIG. 3 is a flowchart that illustrates a method for controlling a display device according to a first exemplary embodiment of the present invention.
Figure 4:
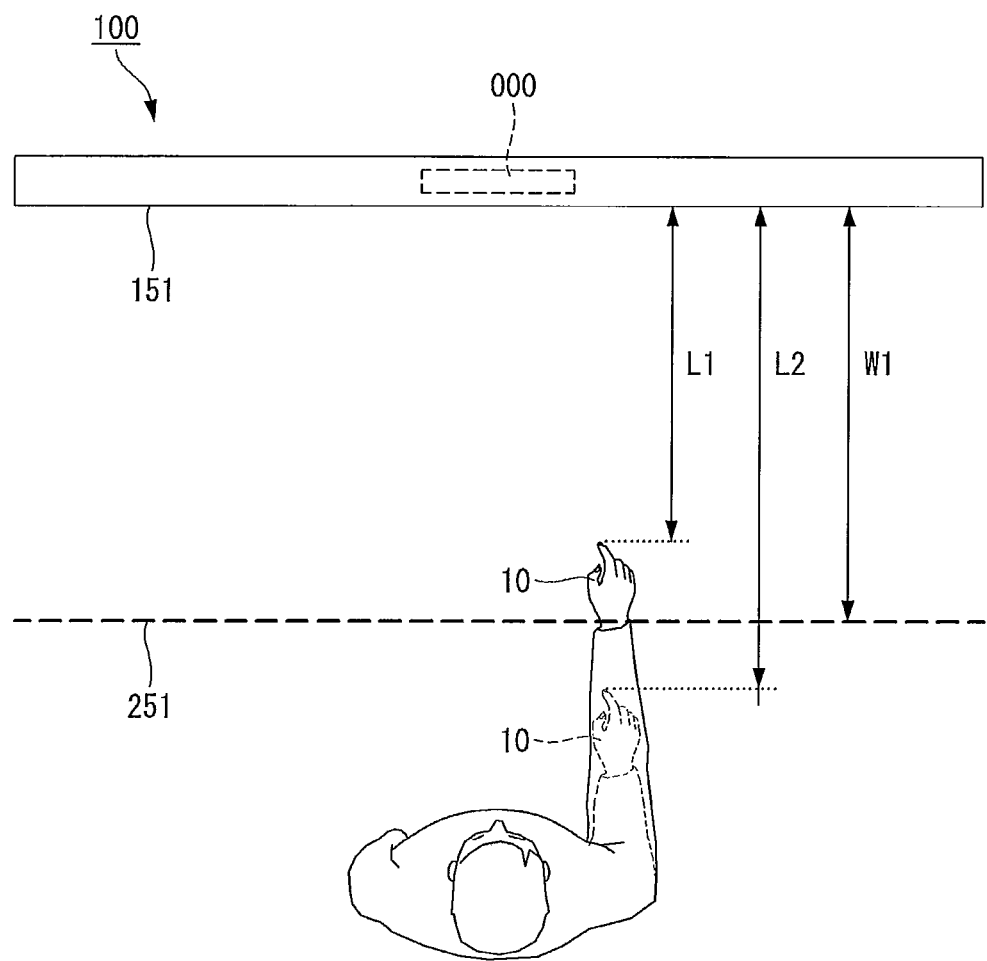
FIG. 4 illustrates a distance between a display device and an external object to depict a method for controlling a display device according to the first exemplary embodiment of the present invention.

FIG. 3 is a flowchart that illustrates a method for controlling a display device according to a first exemplary embodiment of the present invention. FIG. 4 illustrates a distance between a display device and an external object to depict a method for controlling a display device according to the first exemplary embodiment of the present invention. The control method may be performed by the controller 180.

As shown in FIG. 4, a predetermined distance (depth) is maintained between the external object 10 and the display device 100. The external object 10 may be a body part of a user, such as an arm or a hand, which make various external gestures in front of the display device 100. Further, the external object 10 may be a device that transfers gestures of the user such as a stylus pen in case of the touch screen. Hereinafter, the external object 10 is assumed as a finger tip for convenience.

In order to control the display device 100 through predetermined external gestures, the controller 180 determines whether a user who makes gestures obtains a control right or not at step S100. When the user has the control right, the controller 180 precisely controls the display device 100 by performing different functions according to a location (or a distance) of the external object such as a finger tip of a user.

The controller 180 may obtain a distance (also referred to as a depth) to the external object 10 at step S110. The distance to the external object 10 may be obtained through 3D multi-sensors 141a to 141c or a camera 121 comprised in the display device 100.

As shown in FIG. 4, the distance from the external object 10 to the display device 100 may be classified as either a first distance L1 or a second distance L2. The controller 180 determines the distance from the display device 100 to the external object 10 as the first distance L1 and the second distance L2 based on a predetermined criteria location separated from the displace device 100 at a predetermined distance W1. The first distance L1 is shorter than or equal to the predetermined distance W1 from the display device 10. The second distance L2 is longer than the predetermined distance W1. Therefore, external objects located at the first and second distances L1 and L2 have different Z-coordinate values in a coordinate system.

When the controller 180 determines that the external object 10 is located at the first distance from the display device 100 (YES) at S120, the controller 180 performs a first function at step S140. That is, if the external object is located within a first region (area having a distance equal to or less than W1), then the first function is performed. When the controller 180 determines that the external object 10 is located at the second distance from the display device 100 (NO) at step S130, the controller 180 performs a second function at step S150. That is, if the external object is located within a second region (area having a distance greater than W1), then the second function is performed. The second function is different from the first function. Here, the second distance is longer than the first distance as shown in FIG. 4. Further, the first distance L1 is an example of a distance within the first region, and the second distance L2 is merely an example of a distance within the second region. The first and second regions are divided by a virtual touch screen 215.

The first function may be a function that recognizes a gesture of the external object 10 as a touch input based on a coordinate of the external object 10, not as a gesture input through pattern recognition. The second function may be a function that detects a predetermined drawing pattern generated by the user's gesture as a gesture input.

The first function may be a function that control items displayed on the display unit 151. The second function may be a function that controls a cursor on the display unit 151.

For example, the controller 180 can display various items on the display unit 151. Further, the controller 180 can display on the display unit 151 a cursor that waits an input from a user or that indicates a location of the external object. When the external object 10 makes a push gesture at the second distance, the controller 180 may not perform a gesture command corresponding to the push gesture. Although the coordinates of the external object 10 located at the second distance L2 indicate a predetermined item of the display unit 151, the controller 180 may display a cursor on a predetermined position of the display unit 151 corresponding to the coordinate of the external object when the user makes the push gesture. That is, the controller 180 does not perform any events related to the indicated item for the push gesture made at the second distance L2 or within the second region discussed above.

On the contrary, when the external object 10 makes a push gesture at the first distance L1 (or within the first region discussed above), the controller 180 may perform a gesture command according to the push gesture. That is, the controller 180 may perform an event related to the predetermined item corresponding to the push gesture when the coordinate of the external object 10 at the first distance L1 indicates the predetermined item of the display unit 151.

The user may not see locations corresponding to the distance W1 through his or her eyes. However, the controller 180 can recognize a predetermined region separated from the distance device 100 at the distance W1 as a virtual touch screen 215. Therefore, the display device 100 can recognize the movement of the external object at the first distance L1 or within the first region as a touch input. That is, the controller 180 recognizes a predetermined gesture of the external object, which is made inside the virtual touch screen 251 (the first region), not as pattern recognition but as a touch input according to a coordinate of the external object, and performs a predetermined touch event.

Figure 5:
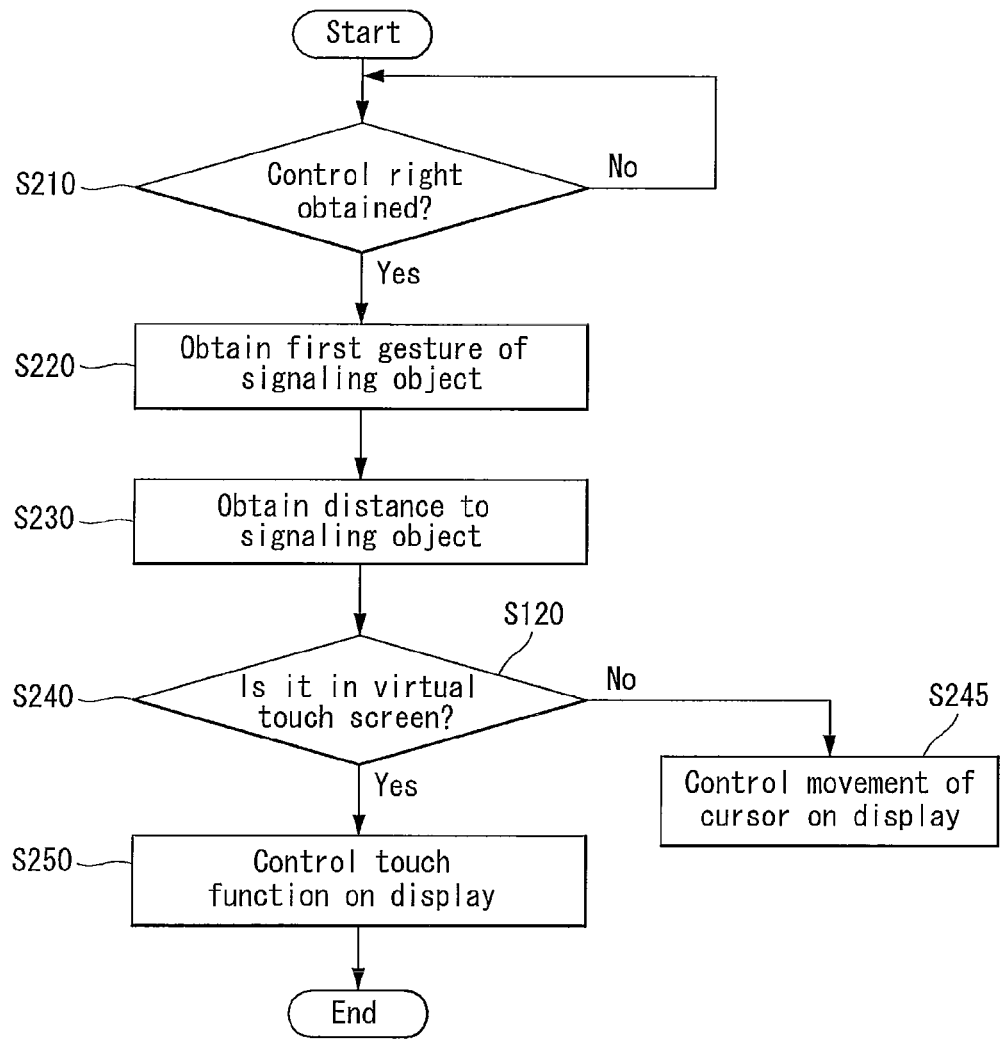
FIG. 5 is a flowchart that illustrates a method for controlling a display device according to the second exemplary embodiment of the present invention.
Figure 6:
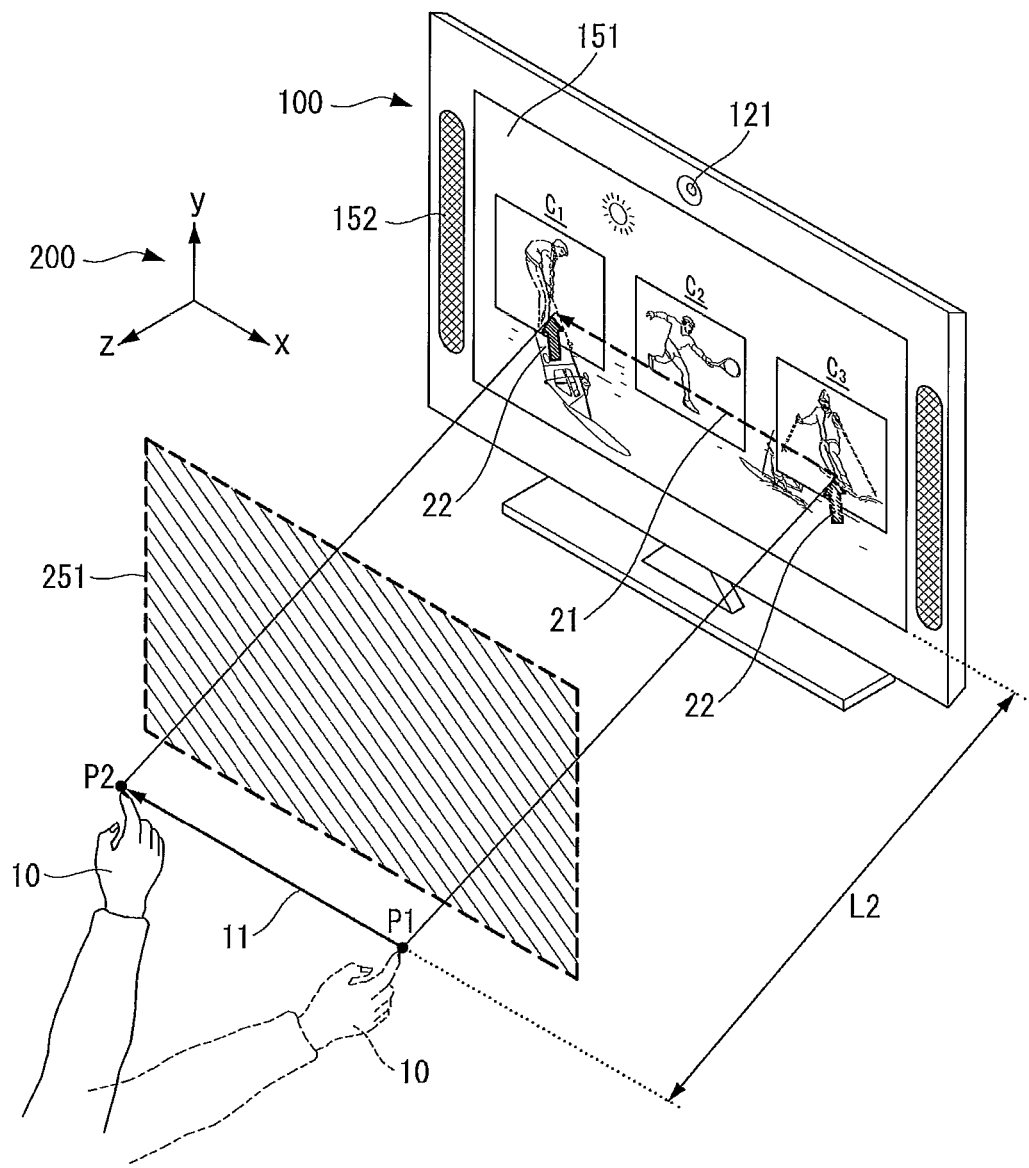
FIGS. 6 to 8 are diagrams for illustrating a method for controlling a display device according to the second embodiment of the present invention.
Figure 7:
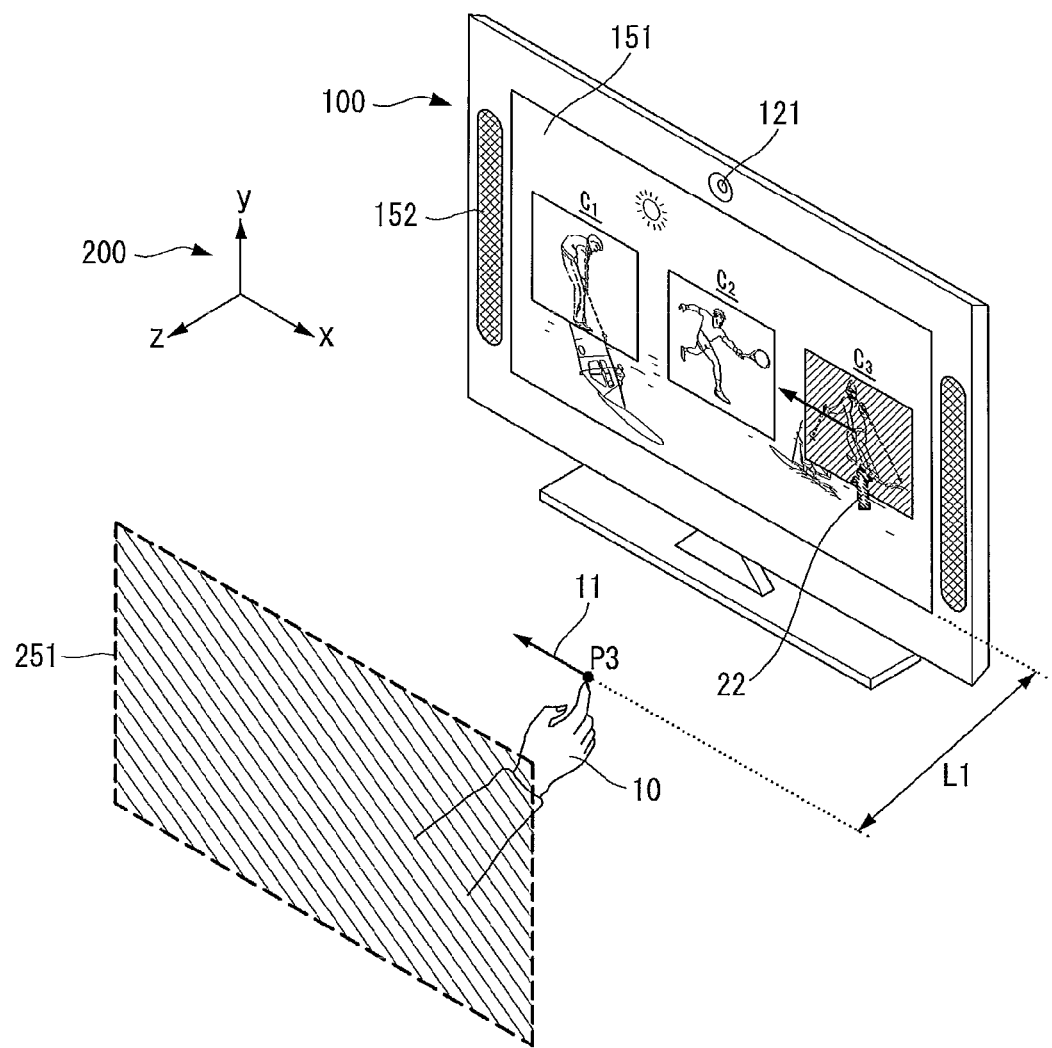
Figure 8:
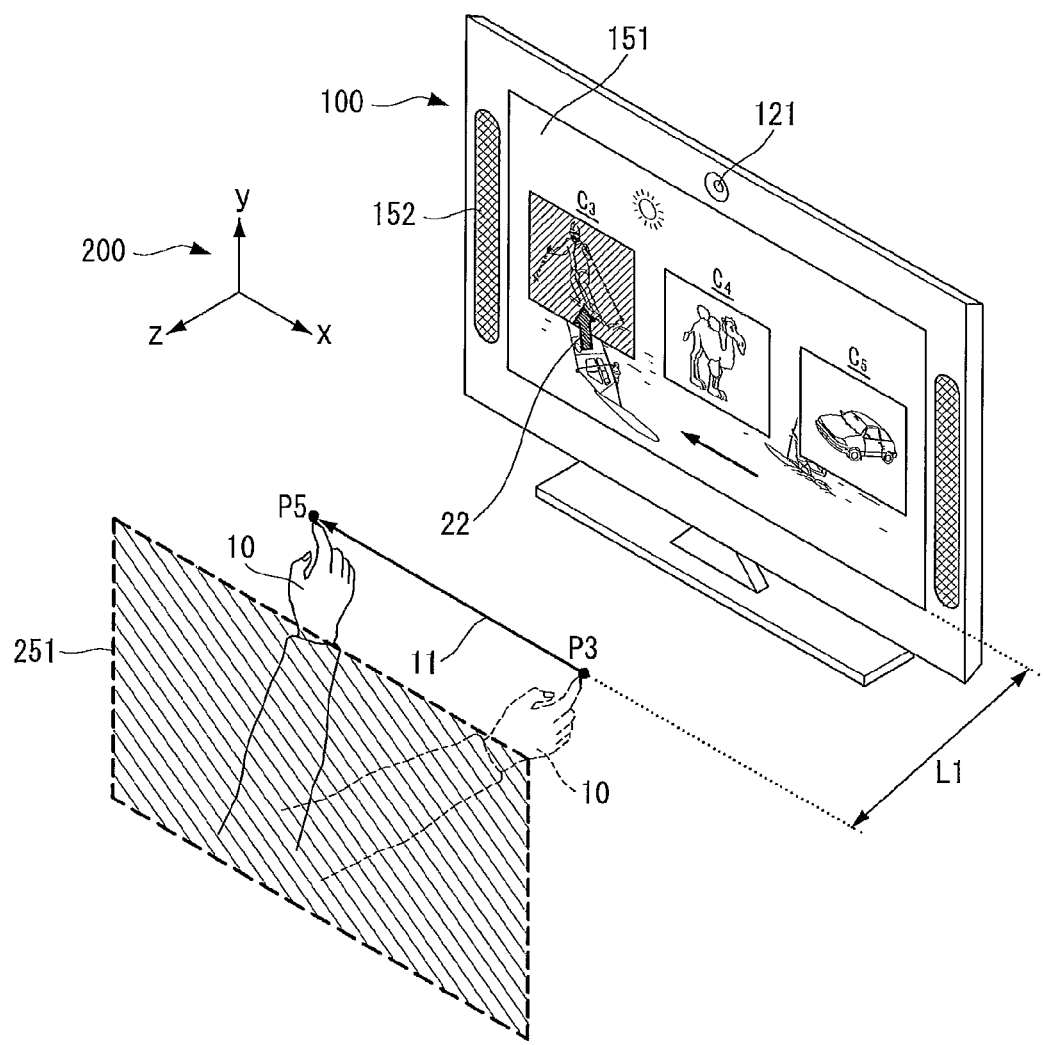

FIG. 5 is a flowchart that illustrates a method for controlling a display device according to the second exemplary embodiment of the present invention. FIGS. 6 to 8 are diagrams for illustrating a method for controlling a display device according to the second embodiment of the present invention. The control method is performed under the controller 180.

The controller 180 may obtain a first gesture of the external object 10 at step S220 when a user obtains a control right (YES) at step S210. For example, the first gesture may be pushing, dragging, dropping, poking, and/or drawing.

The controller 180 obtains a distance to the external object 10 for performing a gesture command related to the obtained first gesture at step S230.

When the controller 180 determines based on the obtained distance that the external object 10 is located outside the virtual touch screen 251 (NO) at step S240, the controller 180 controls the movement of a cursor on the display device. Being outside the virtual touch screen 251 preferably means the external object is positioned at a distance greater than W1 from the display unit/device. For instance, being outside the virtual touch screen 251 can mean the external object is located within the second region.

For example, the operation of the controller 180 will be described when the external object 10 makes a gesture of dragging an item from a first position P1 to a second position P2 outside the virtual touch screen area 251 as shown in FIG. 6. As shown in FIGS. 6 to 8, a user may interact with the display device 100 front the display unit 151 using a predetermined body part such as a finger tip or an arm. The user is in close proximity to the display device 100 to interact with the display device 100.

A sign 200 denotes a coordinate system. An X-axis and a Y-axis define a horizontal position and a vertical position of an object on the display unit 151, and a Z-axis defines a vertical distance from the display unit 151. The user can make a gesture using a predetermined body part such as a finger tip or an arm in order to interact with various items displayed on the display unit 151.

The controller 180 displays a cursor 22 on a position, which is overlapped with an item C3 displayed on the display unit 151, corresponding to a coordinate of the first position P1. When the external object 10 moves from the first position P1 to the second position P2 outside the virtual touch screen 251, the camera 121 tracks the movement of the external object 10 and the cursor 22 may be moved correspondingly to the movement of the external object 10. Here, only the cursor 22 is moved while the image displayed on the screen does not move.

For example, when a coordinate of the position P1 is (X1, Y1, Z1), the controller 180 can locate the cursor 22 on an item C3 corresponding to the coordinate (X1, Y1, Z1) of the position P1. When the external object 10 horizontally moves from the first position P1 to the second position P2 thereafter, the controller 180 moves the cursor 22 to a position on the display unit 151 corresponding to the coordinate (X2, Y1, Z1) of the second position P2. That is, the controller 180 moves the cursor 20 to the item C1. As described above, the controller 180 can change a coordinate of the cursor on the display device when the coordinate of the external object 10 is changed.

When the external object 10 is located inside the virtual touch screen 251 (YES) at step S240, the controller 180 can control a touch function on a display device Being inside the virtual touch screen 251 preferably means the external object is positioned within the first region or at a distance equal to or less than W1 with respect to the display device/unit.

For example, when the external object 10 is located at a predetermined position P3 inside the virtual touch screen 251 as shown in FIG. 7 (e.g., the user's hand is stretched out more towards the DTV), the controller 180 locates the cursor overlapping the item C3 and simultaneously selects the item C3 by processing the movement of the external object 10 as a touch input. Then, when the external object 10 moves from the position P3 to a position P5 inside the virtual touch screen area 251, the controller 180 can move the cursor with the selected item C3 together from the position P3 to a position P5 on the display unit 151, as shown in FIG. 8. Here, both the cursor 22 as well as the selected item C3 are moved. For instance, the movement of the external object 11 inside the virtual touch screen 251 can be used as the touch input and touch-and-drag input on the screen of the display device.

That is, when a coordinate of the position P3 is (X'1,Y'1, Z'1) in FIG. 7, the controller 180 can locate the cursor 22 on an item C3 corresponding to the coordinate (X'1, Y'1, Z'1) to select the item C3. At this time, if the external object 10 horizontally moves in left from the position P3 to the position P5, the controller 180 can move the cursor 22 with the selected item C3 to a position on the display unit 151 corresponding to the coordinate (X'2,Y'1,Z'1) of the position P5. Accordingly, new items C4 and C5 are displayed on the display unit 151. For instance, as the external object 10 moves from P3 to P5, the screen is scrolled to the left as the selected item C3 is scrolled to the left accordingly.

As described above, an entire screen shown on the display unit 151 is controlled corresponding to the location change of the external object 10 as shown in FIG. 8. That is, the entire screen shown on the display unit 151 moves in a certain direction according to the movement of the external object 10. Accordingly, new items C4 and C5 can be displayed on the display unit 151.

As a variation, when the external object 10 moves inside the virtual touch screen 251 from a first position to a second position, the controller 180 may move only an item displayed on the display unit 151 corresponding to the first position to a position corresponding to the second position. For example, the controller 180 moves only the item C3, not the entire screen, to be overlapped with the item C1 when the external object 10 moves as shown in FIGS. 7 and 8.

Meanwhile, the controller 180 may output a predetermined effect sound pattern or a predetermined vibration pattern as a feedback through the output unit 150 when the external object 10 makes a gesture of a touch input for selecting the item C3 inside the virtual touch screen 251. Accordingly, the user can determine intuitively whether his or her gesture is processed based on the feedback.

The above described embodiments were described under an assumption that the virtual touch screen 251 is set at a predetermined position separated from the display device 100 at a predetermined distance by the display device 100.

However, the present invention is not limited thereto. The virtual touch screen 251 may be set by a user. For example, a user may set the location of the virtual touch screen 251 by making a predetermined gesture toward the display unit 151. Hereinafter, a process for setting a region of the virtual touch screen 251 will be described in detail.

FIGS. 9 to 12 are diagrams that illustrate setting a virtual touch screen region.

A virtual touch screen 251 is not a physical touch screen 151 physically attached at a display panel of a display device 100. The virtual touch screen 251 may be a spatial region separated from the display device 100 at a predetermined distance. When an external object is located at a predetermined position inside the predetermined spatial region, the controller 180 may detect the external object as making a touch input and outputs a predetermined event corresponding to the touch input on the display device 100 like a touch input made at the touch screen 151.

Accordingly, the virtual touch screen 251 may be virtually created on a predetermined spatial region based on a distance from the display device 100 to the external object, which is obtained through a camera 121 or a sensor 140 included in the display device 100.

The virtual touch screen 251 may be a planar area formed at a predetermined position separated in a vertical direction from the display device 100, or the virtual touch screen 251 may be an area formed at a predetermined position and having a predetermined range. Thus, as discussed above, the virtual touch screen 251 can be an imaginary wall or line, and when the external object 10 is positioned between the display device 100 and the virtual touch screen 251, the external object 10 and a movement of the external object 10 can cause a touch selection and a touch-and-drag input. When the external object 10 is positioned between the virtual touch screen 251 and the user, the movement of the external object may cause the cursor on the screen to move accordingly. Different operations/functions may occur in these scenarios depending on the system configuration and set up.

Figure 9:
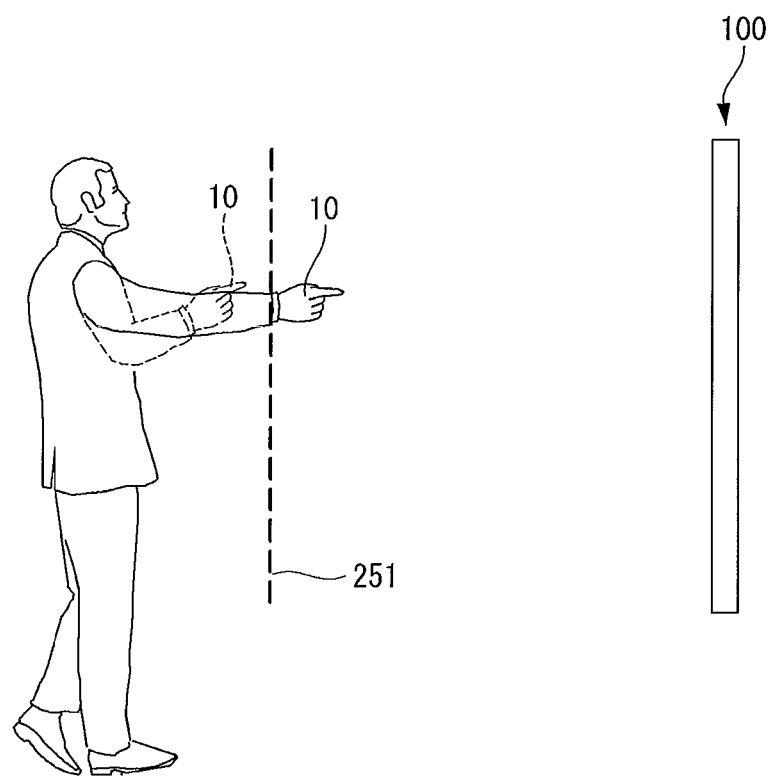
FIGS. 9 to 12 are diagrams that illustrate setting a virtual touch screen region.

FIG. 9 illustrates setting a virtual touch screen 251 having a predetermined area according to an embodiment.

As shown in FIG. 9, the virtual touch screen 251 may be formed at a position separated from the display device 100 at a predetermined distance. The predetermined distance may be decided when the display device 100 is manufactured or the predetermined distance may be decided by a user.

For example, when a user having a control right stretches an arm toward the display unit 151 from a predetermined position that is separated from the display device 100 at a predetermined distance as shown in FIG. 9, the controller 180 can set a virtual touch screen 251 at a predetermined position between the display unit 151 and the arm.

Figure 10:
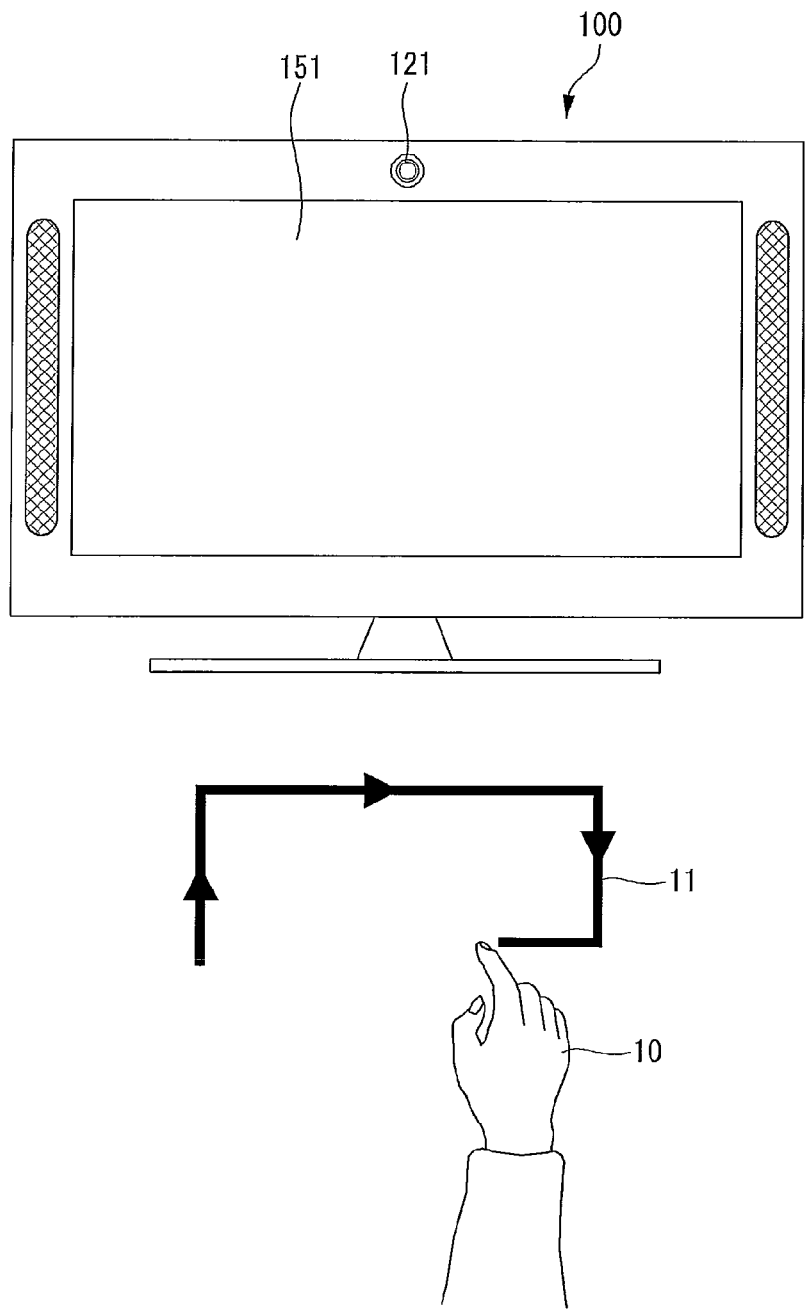

As shown in FIG. 10, the predetermined distance for forming the virtual touch screen 251 may be decided by a predetermined drawing gesture made at a predetermined position that is separated from the display device 100 at a predetermined distance. For example, when the display device 100 recognizes a drawing gesture that forms a looped curve, the virtual touch screen 251 may be formed at a position where the looped curve is formed, as shown in FIG. 10.

Figure 11:
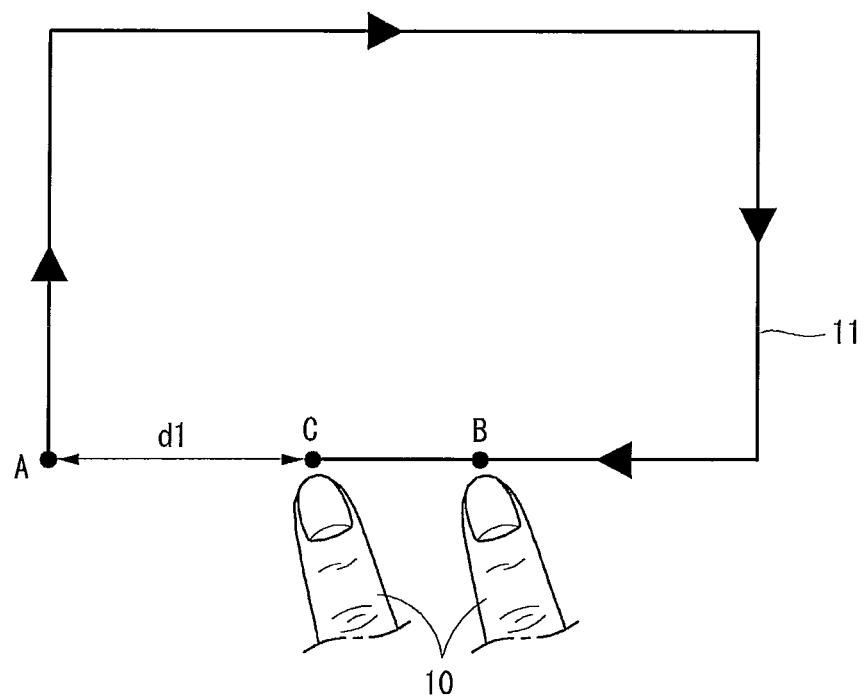

The drawing gesture forming the looped curve will be described in more detail with reference to FIG. 11.

Various criterions may be defined for forming a looped curve. For example, the controller 180 may determine that the movement of the external object 10 forms a looped curve if the external object 10 forms a predetermined trace from a start point A, moves back toward the start position, and becomes closer than a predetermined distance d1 from the start point A.

For example, the controller 180 may determine that the external object 10 does not form a looped curve if the external object 10 forms a predetermined trace from a start point A, moves back toward the start position, and stays at a predetermined position B which is not in the predetermined distance d1 from the start point A.

For example, the controller 180 may determine that the movement of the external object 10 forms a looped curve if the external object 10 forms a predetermined trail from a start point A, moves back toward the start position, and arrives at a position C separated from the start point A at the predetermined distance d1.

When the movement of the external object 10 forms a predetermined looped curve, the controller 180 can set a plan in parallel to the formed looped curve as a virtual touch screen.

Figure 12:
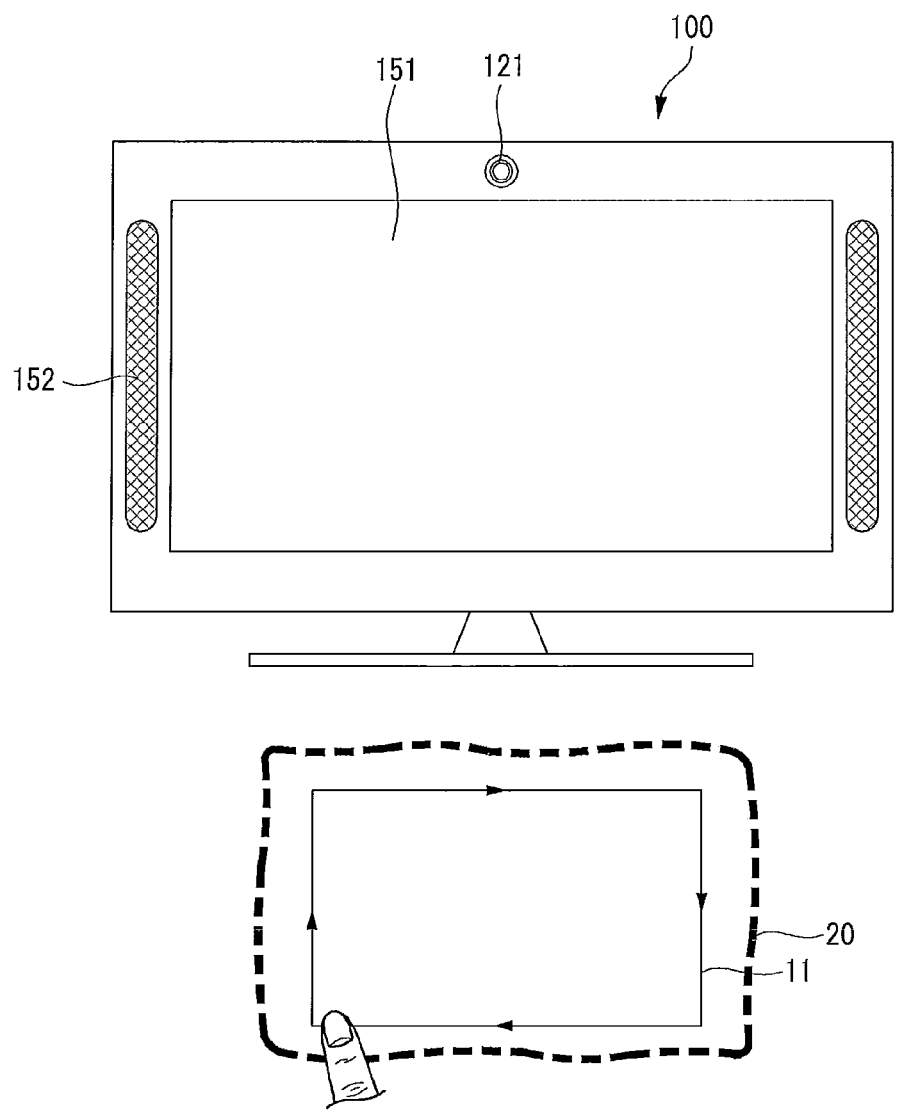

For example, when a finger tip of a user draws a looped curve 20 as shown in FIG. 12, the controller 180 sets a plane 11 in parallel to the looped curve 20 as the virtual touch screen 215.

A plane set as the virtual touch screen 251 may be set in various methods. For example, the controller 180 may set a plane having the looped curve 20 as a boundary as the virtual touch screen 251.

For another example, the controller 180 may set a plane 11 included in the looped curve 20 as the virtual touch screen 215.

As described above, FIGS. 10 to 12 show that the push gesture starts setting the virtual touch screen 251 and forms the virtual touch screen 251 having a predetermined area. The virtual touch screen 251 may be formed within a predetermined radius area around the extended arm of a user. Accordingly, the formed virtual touch screen 251 may be canceled when the user moves out from the predetermined radius area.

When the user having the control right changes his or her location after forming the virtual touch screen 251, the controller 180 can maintain the virtual touch screen having the same radius area at the changed location.

When the user losses the control right of the display device 100 after forming the virtual touch screen 251, the virtual touch screen area may be canceled. In this case, the controller 180 may activate a function of the previously created virtual touch screen 215 in order to enable the user to successively use the previously created virtual touch screen 215 when the user regains the control right.

In order to enable the user to successively use the previously created virtual touch screen 215, information on a unique virtual touch screen area mapped with a user is stored in the memory 160. Such unique virtual touch screen area information may be information on a coordinate of a virtual touch screen.

Figure 13:
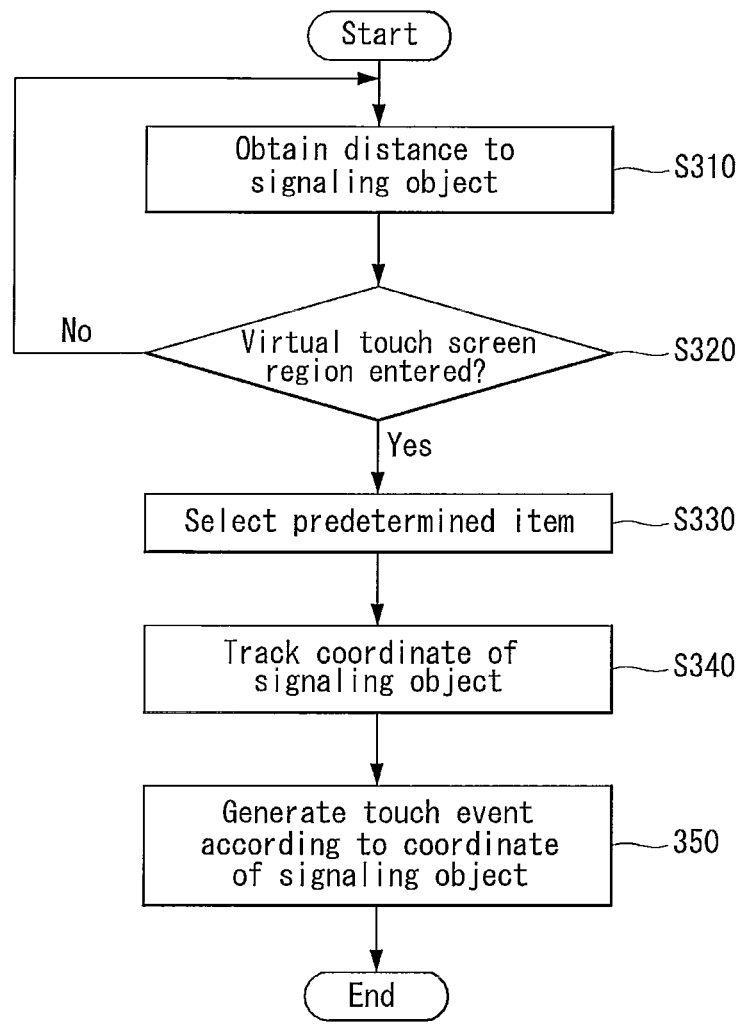
FIGS. 13 and 14 are flowcharts that illustrate a method for controlling a display device according to a third embodiment of the present invention.
Figure 14:
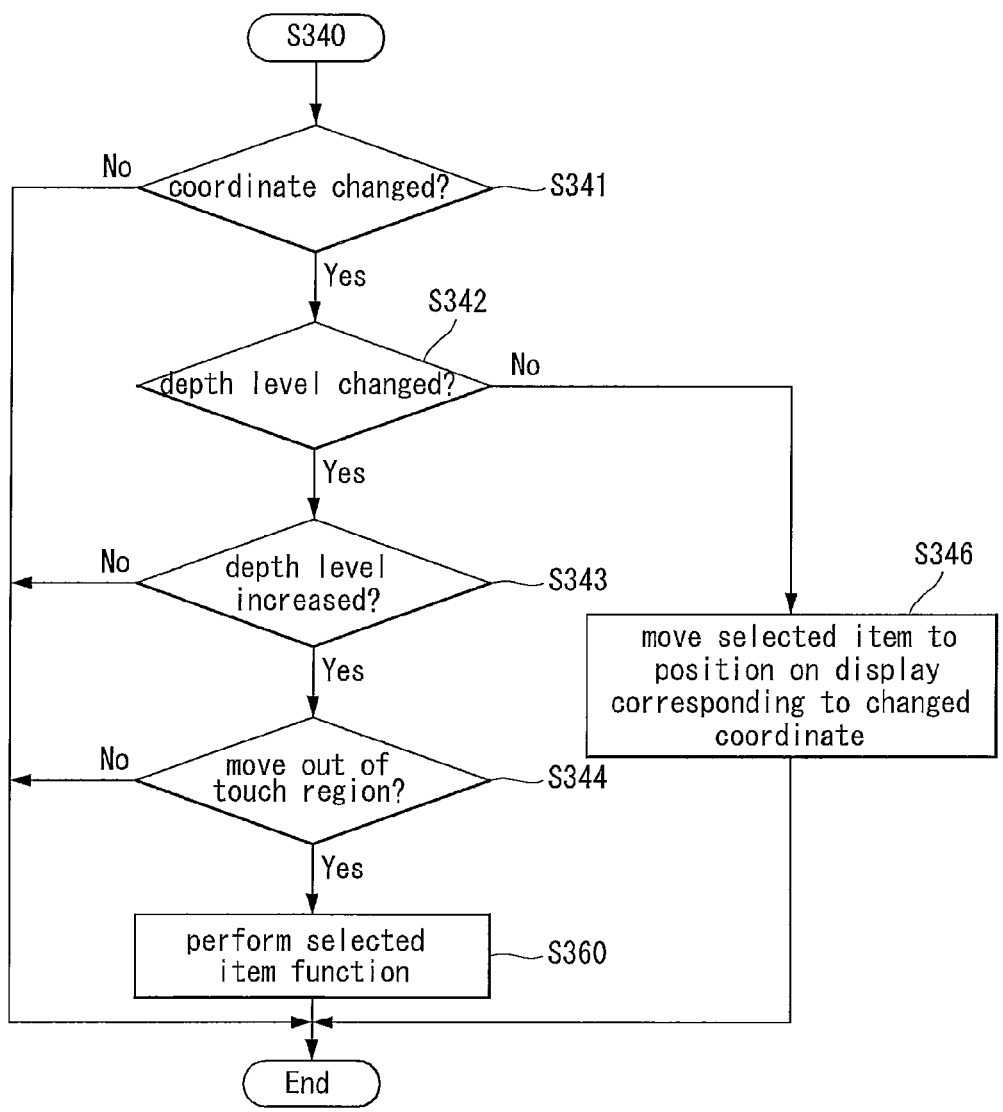
Figure 15:
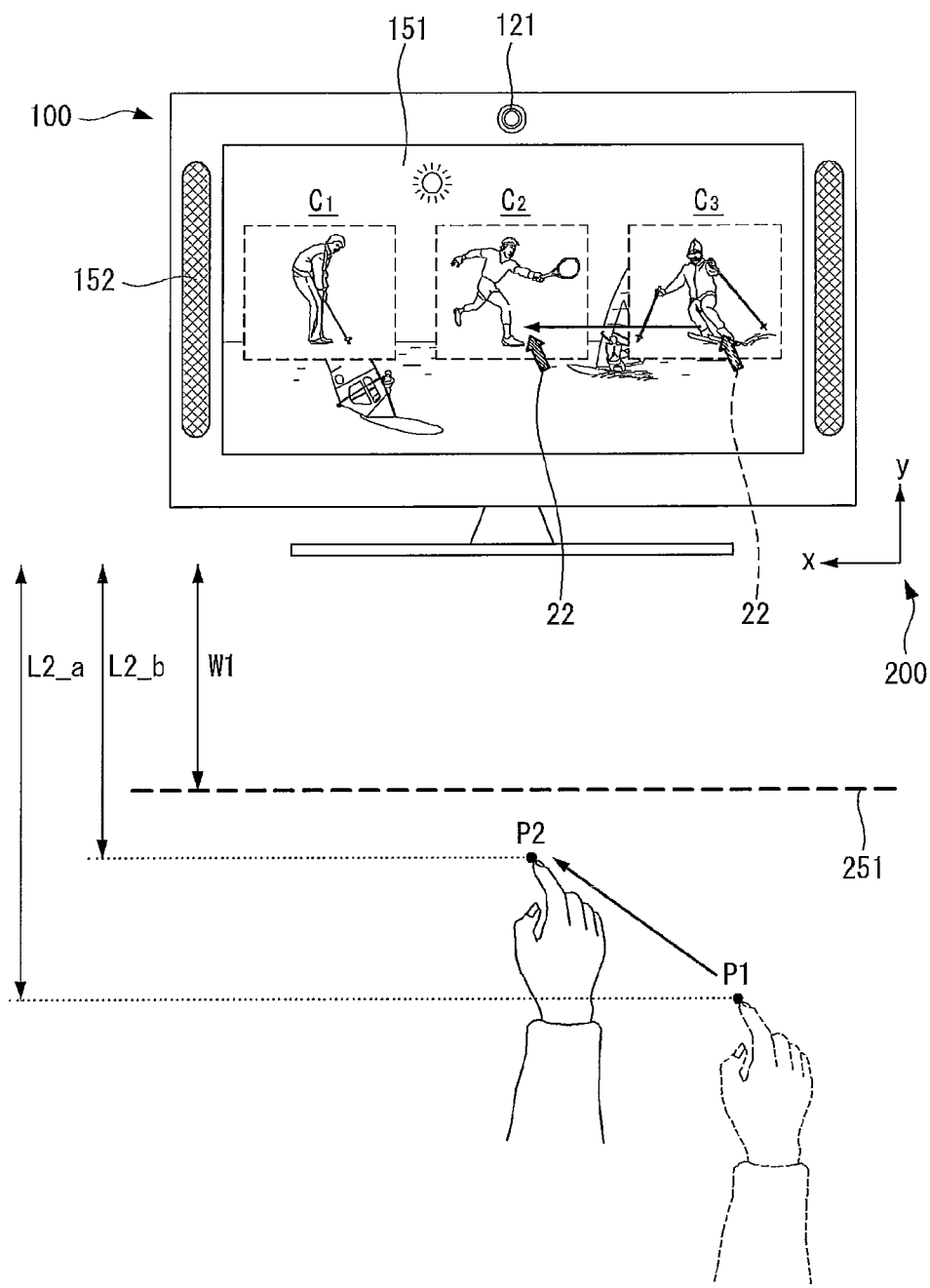
FIGS. 15 to 18 are diagrams for describing the method for controlling a display device according to the third embodiment of the present invention.
Figure 16:
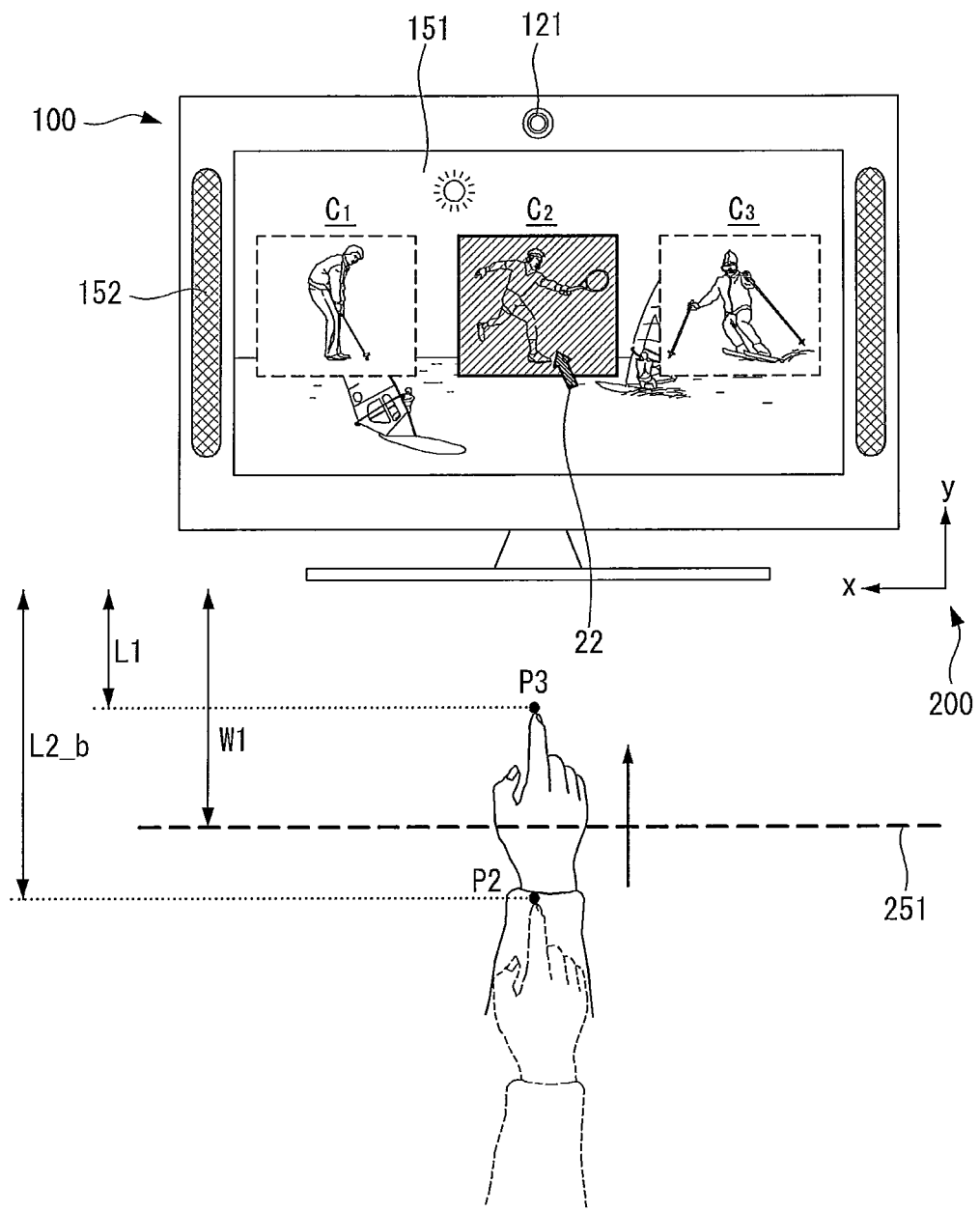
Figure 17:
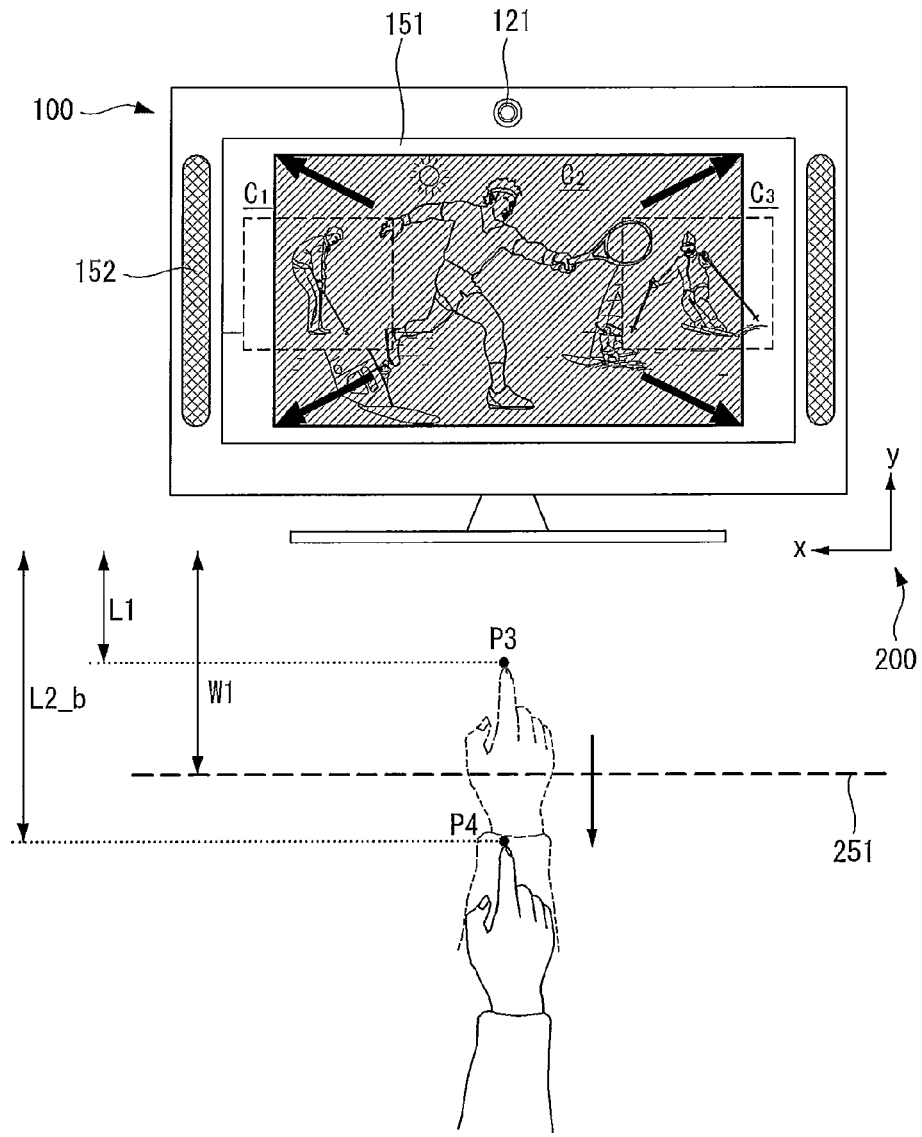

FIGS. 13 and 14 are flowcharts that illustrate a method for controlling a display device according to a third embodiment of the present invention. FIGS. 15 to 17 are diagrams for describing the method for controlling a display device according to the third embodiment of the present invention. The control method is performed by the control of the controller 180. Hereinafter, a process of realizing a touch effect when an external object moves out from the virtual touch screen after the external object enters in the virtual touch screen will be described with reference to FIGS. 13 to 17.

At step S310, the controller 180 obtains a distance between the display device 100 and the external object 10 (signaling object). At step S320, the controller 180 determines that the external object 10 enters an area of the virtual touch screen 251 based on the obtained distance. That is, the controller 180 determines whether or not the external object 10 is positioned inside the virtual touch screen 251 (area between the virtual touch screen 251 and the display device 100).

When the controller 180 detects a predetermined gesture such as a push gesture without the external object 10 entering the virtual touch screen 215 as shown in FIG. 15, the controller 180 can control the movement of a cursor on the display unit 151 as described above. That is, when the controller 180 detects a push gesture from a position P1 to a position P2 outside the virtual touch screen 251, the controller 180 can move, without moving any item displayed on the display unit 151, the cursor 22 on the display unit 151 from a position on the display unit 151 corresponding to the coordinate of the position P1 to another position on the display unit 151 corresponding to the coordinate of the position P2.

As described above, an operation of the display device 100 performed for a predetermined gesture of the external object made outside the virtual touch screen 215 may be equivalent to moving a mouse without a mouse button pushed.

An operation of the display device 100 performed for a predetermined gesture of the external object made inside the virtual touch screen 251 may be equivalent to moving a mouse with a left button of the mouse pushed. The push gesture made from the outside of the virtual touch screen 251 to the inside of the virtual touch screen 251 may be equivalent to pushing the left button of the mouse.

At step S330, the controller 180 selects a predetermined item on the display unit 151 when a push gesture is made from a position P2 outside the virtual touch screen 251 to a position P3 inside the virtual touch screen 251 as shown in FIG. 16.

At step S340, the controller 180 tracks a coordinate of the external object when the external object 10 is present inside the virtual touch screen 251.

At step S350, the controller 180 creates a touch event according to the coordinate of the external object 10. For instance, in FIG. 16, the movement of the external object 10 to P3 causes a touch selection of an item C3 with the cursor 22.

Hereinafter, a process of performing a predetermined function when a coordinate of the external object 10 is changed after the external object 10 enters inside the virtual touch screen 251 will be described with reference to FIG. 17.

At step S341, the controller 180 determines whether a coordinate of the external object 10 is changed or not after the external object 10 enters the virtual touch screen 251.

When a Z-coordinate value of the external object becomes larger as shown in FIG. 16, the controller 180 may recognize the increment of the Z-coordinate value as the external object 10 moves back and out from the virtual touch screen 251. In this case, the controller 180 may recognize such movement of the external object as deselecting a selected item after selecting the item by receiving a touch input for selecting the predetermined item.

Accordingly, at step S360, the controller 180 may perform a predetermined event corresponding to the selected item C2 when the external object 10 moves back and out from the virtual touch screen 251 at step S344 as shown in FIG. 17 after the item C2 is selected by the external object 10 entered inside the virtual touch screen 251 as shown in FIG. 16. For example, the controller 180 may perform a predetermined program related to the item C2.

Figure 18:
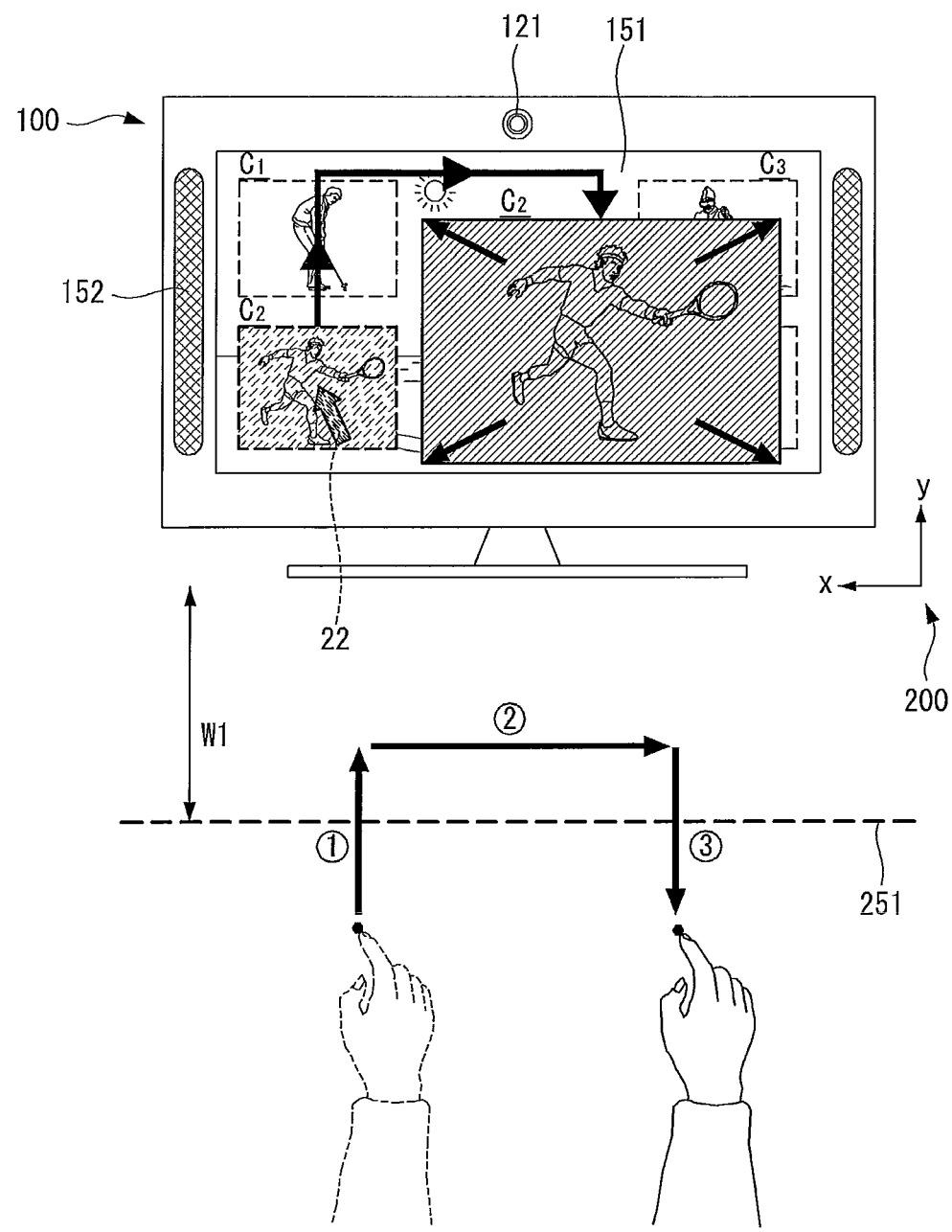

As shown in FIG. 18, the external object 10 may move out from the virtual touch screen 251 after the external object 10 enters inside the virtual touch screen 251. In this case, one of an X coordinate value and a Y coordinate value of the external object 10 may be changed. In this case, the item C2 is performed at the moment that the external object 10 moves out of the virtual touch screen 251.

If one of the X-coordinate and the Y-coordinate of the external object 10 is changed inside the virtual touch screen 251 without the Z coordinate being changed, the controller 180 may move the selected item to a position on the display unit 151 corresponding to the changed coordinate.

Further, the controller 180 does not perform any event related to the selected item C2 when the Z-coordinate value becomes smaller inside the virtual touch screen 251 or when the Z coordinate value becomes larger inside the virtual touch screen 251.

In more detail, the coordinates of the position P2 and the position P3 have the same X coordinate and the same Y coordinate but different Z coordinate as shown in FIGS. 16 and 17.

In this case, the controller 180 may perform a function of selecting the item C2 in response to a push gesture of the external object 10 from the position P2 to the position P3 when the item C2 is positioned on the display unit 151 corresponding to the position P2 or the position P3.

The controller 180 may move the selected item C2 when the external object 10 moves after selecting the item C2.

Meanwhile, when items are not presented on the display unit 151 corresponding to the position P2 or the position P3 and when the external object 10 moves from the position P3 to a new position in the virtual touch screen 251, the controller 180 may move the cursor 22 on the display unit 151 corresponding to a coordinate of the new position in response to the push gesture made by the external object 10.

As described above, the controller 180 can recognize a gesture of the external object 10 as selecting a predetermined item displayed on the display unit 151 when a hand of a user enters inside the virtual touch screen 251 and moves out from the virtual touch screen 251.

However, such a method of selecting an item without directly touching the display unit 151 is not limited thereto. For example, when a distance from the display unit 151 to a hand of a user is established to be smaller than a predetermined threshold value for a predetermined duration, the controller 180 may recognize this gesture as the external object 10 selects a predetermined time displayed on the display unit 151.

For another example, when a speed of moving a hand of a user in a Z coordinate direction is greater than a predetermined threshold value, the controller 180 recognizes this gesture as the external object selects the item.

For another example, when a speed of moving a hand of a user in an X coordinate direction and a Y coordinate direction is smaller than a predetermined threshold value for a predetermined duration, the controller 180 recognizes this gesture as the external object selects the item.

Figure 19:
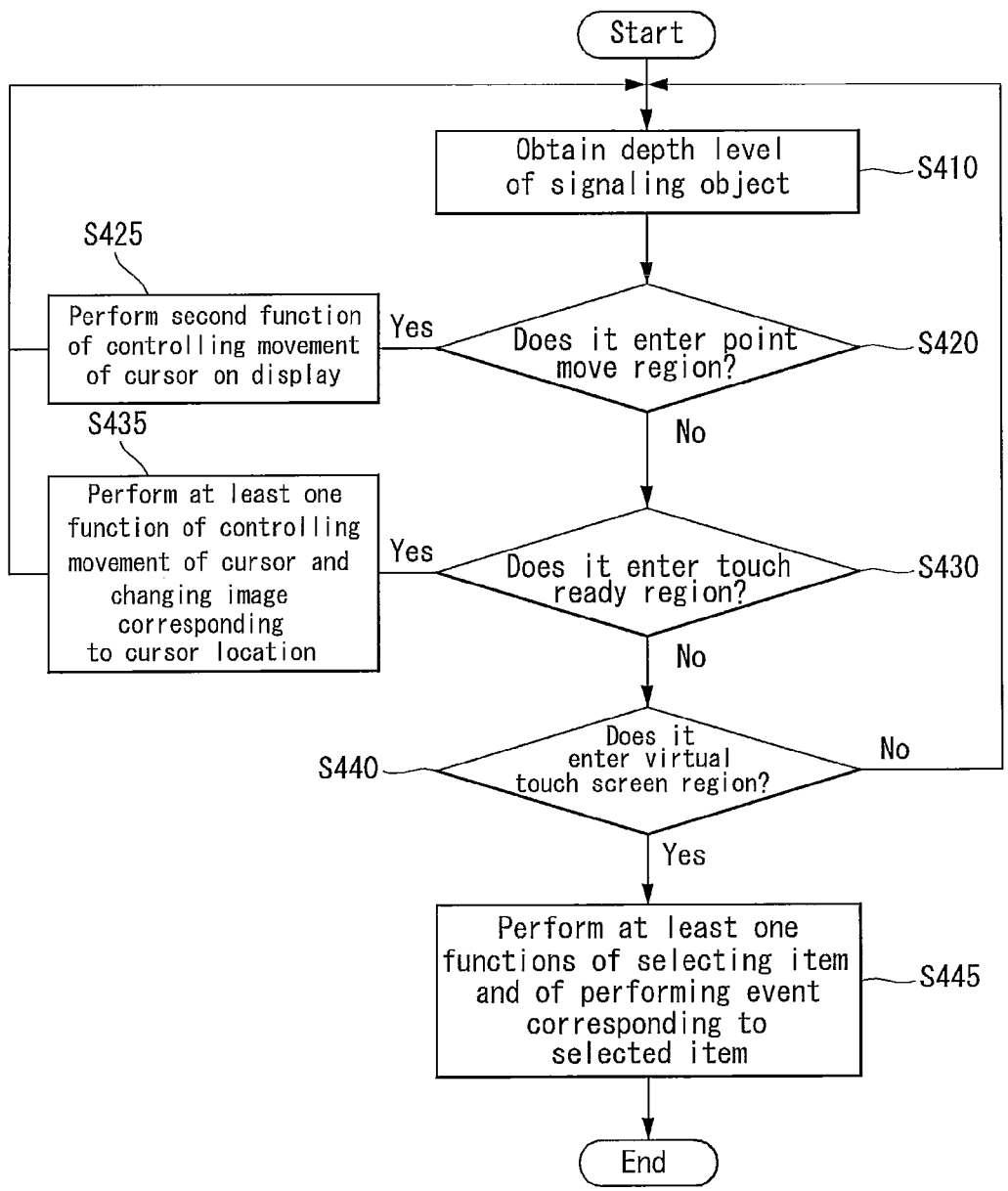
FIG. 19 is a flowchart that illustrates a method for controlling a display device according to the fourth embodiment of the present invention.

FIG. 19 is a flowchart that illustrates a method for controlling a display device according to the fourth embodiment of the present invention. FIGS. 20 to 23 are diagrams for describing the method for controlling a display device according to the fourth embodiment of the present invention. The control method is performed under the control of the controller 180.

The method for controlling a display device according to the fourth embodiment of the present invention may minimize erroneous operations caused by errors in recognizing a gesture. In order to minimize the erroneous operations, a region between the display device 100 and the external object 10 is divided into a plurality of virtual regions.

When the external object 10 is located at one of the plurality of virtual regions, the controller 180 may perform different functions according to a property of a virtual region where the external object 10 is located.

Figure 20:
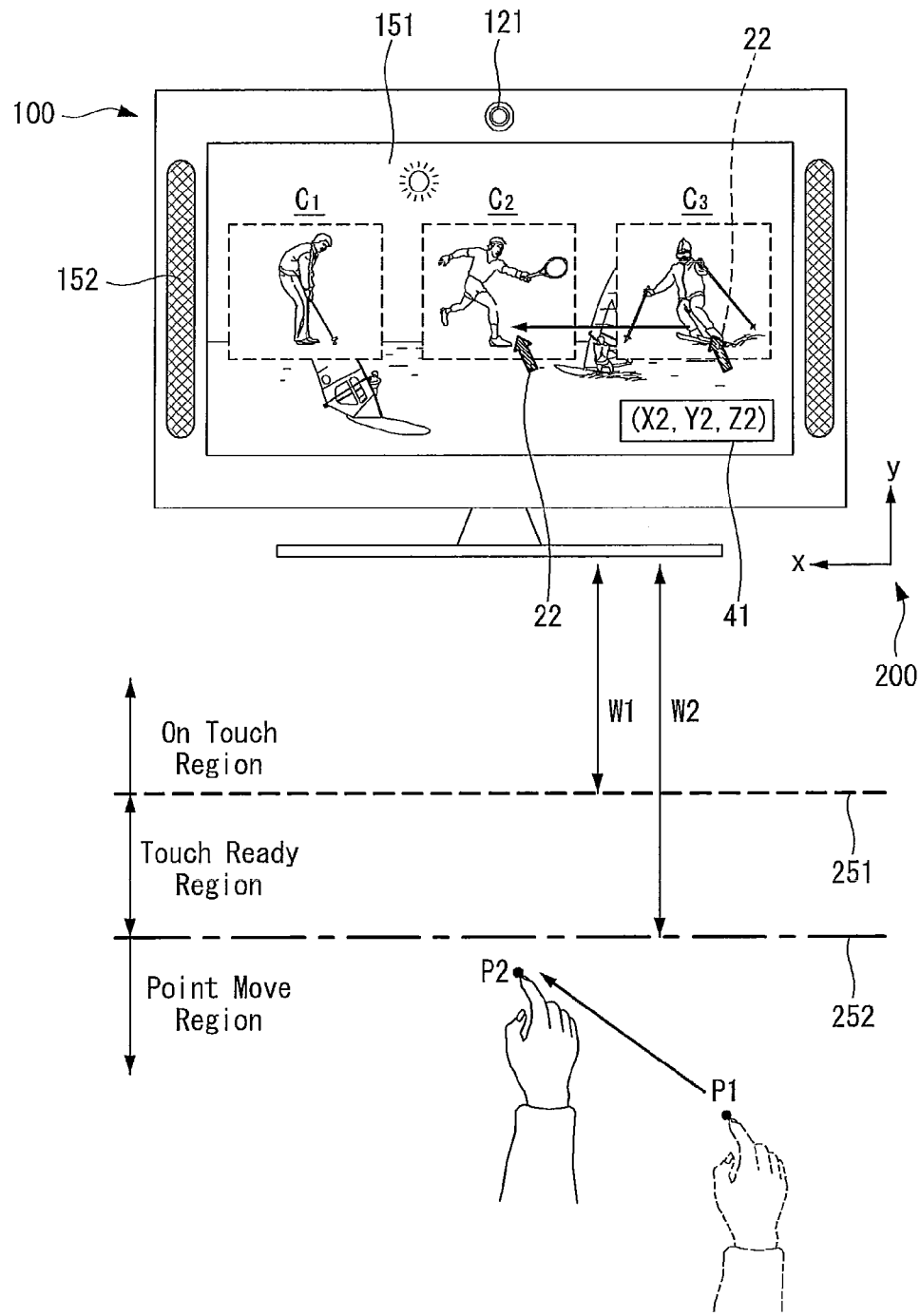
FIGS. 20 to 23 are diagrams for describing the method for controlling a display device according to the fourth embodiment of the present invention.

Referring to FIG. 20, the plurality of virtual regions may be classified into an on-touch region, a touch-ready region (selection ready region), a point-move region according to a distance from the display device 100. The on-touch region corresponds to a region/inside of the virtual touch screen 251 and since the virtual touch screen region was already described in the above embodiments, the detail description thereof is omitted herein. The point move region is separated from the touch ready region by a virtual line 252, and is a region in which when the external object is in that region, the controller 180 can control movements of a cursor on the display unit 151 corresponding to the movement of the external object. The touch ready region may be provided between the virtual touch screen region and the point move region.

As described above, the movement of the external object in the virtual touch screen region may be recognized as the external object is located at a first distance. The movement of the external object in the touch ready region may be recognized as the external object 10 is located at a second distance. The movement of the external object in the point move region may be recognized as the external object 10 is located at a third distance.

The controller 180 of the display device 100 performs a first function when the object is located at the first distance. The controller 180 performs a second function when the object is located at the second distance. Here, the second distance is longer than the first distance. Furthermore, the controller 180 performs a third function when the object is located at the third distance. The third distance is longer than the first distance and shorter than the second distance. The first, second, and third functions are different from each other.

The controller 180 may obtain a distance to the external object. The distance to the external object may be obtained through a depth level of the external object captured by a 3D camera 121 at step S410.

When the controller 180 determines that the object 10 enters the point move region at step S420, the controller 180 controls the movement of the cursor 22 on the display unit 151 at step S425. For example, when the object 10 moves from a position P1 to a position P2 in the point move region (FIG. 20), the controller 180 moves the cursor 22 from a position overlapped with an item C3 to another position overlapped with an item C2.

As described above, the controller 180 controls the movement of the cursor on the display unit 151 when the object moves in the point move region. However, the controller 180 does not control functions related to items indicated by the cursor or functions related to a background.

When the object moves from a position P1 to a position P2 in the point move region, the controller 180 may provide feedback according to the movement of the object at the same time of controlling the movement of the cursor 22. For example, the controller 180 provides a feedback by displaying a coordinate of the object 10 on the display unit 151. The feedback may be provided using at least one of a visual sense, an acoustic sense, and a tactile sense.

When the controller 180 determines that the object 10 enters the touch ready region based on the depth level at step S430, the controller 180 can control the movement of the cursor 22 on the display unit 151. Furthermore, the controller 180 can inform a user that the object 10 is located inside the touch ready region by changing an image of a predetermined area corresponding to the position of the cursor 22.

Figure 21:
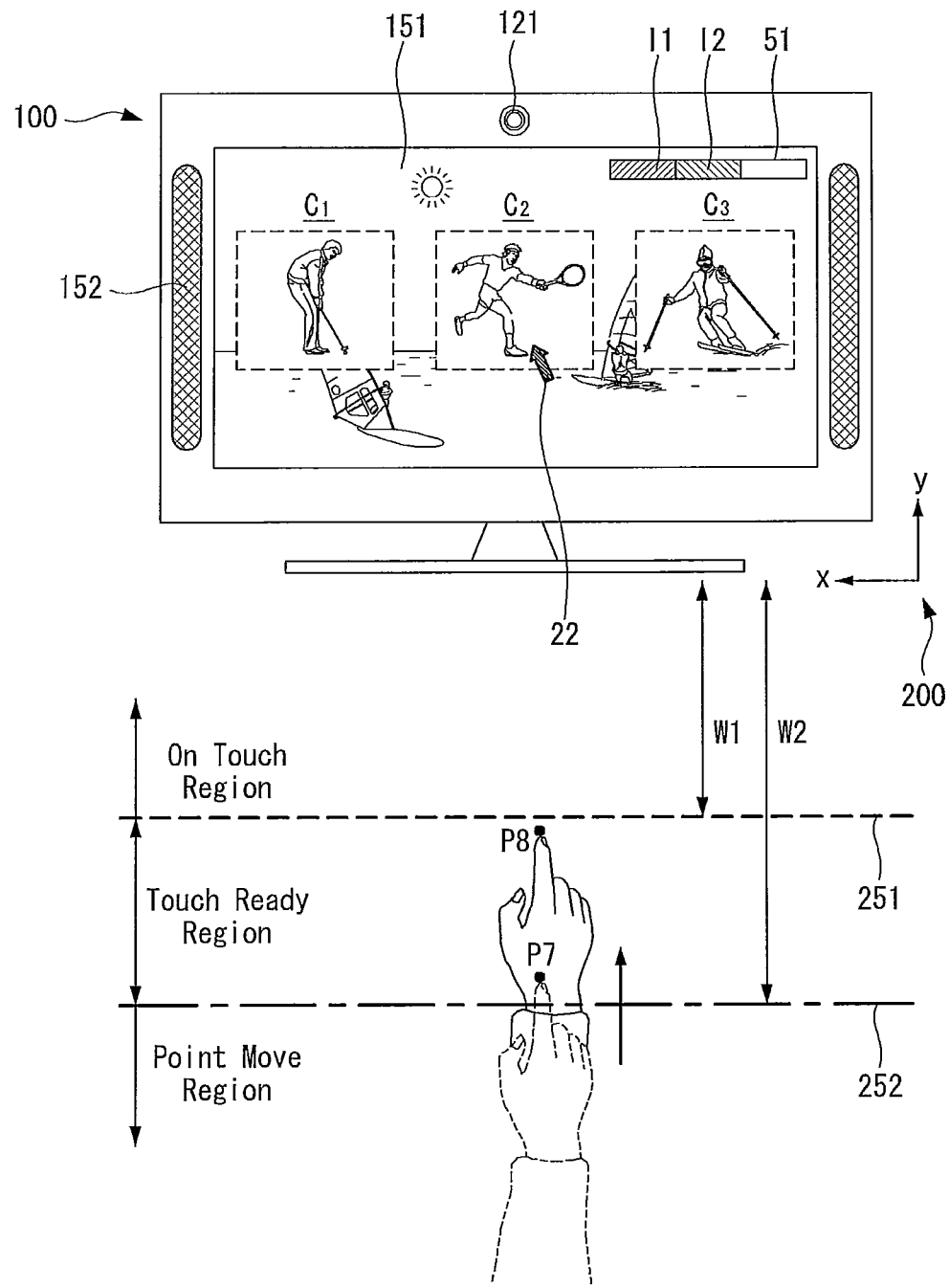

For example, when the object 10 makes a push gesture toward the display device 100 in the point move region as shown in FIG. 21, the object 10 may not enter the virtual touch screen because the push generated is not long enough to reach the virtual touch screen. In this case, a Z-coordinate of the cursor 22 is changed and the cursor 22 is not moved although the object 10 is now in the touch ready region.

The controller 180 may visually provide information on a distance to the touch region according to the movement of the object 10 in the touch ready region (see 51 of FIG. 21).

For instance, the controller 180 may provide information on a distance from the object 10 to the touch region or changes of the distance by changing an image of a predetermined area on the display unit 151 corresponding to the current position of the cursor. For example, an indicator 51 may be provided at a predetermined area of the display unit 151. The indicator 51 may include a plurality of sections I1, I2, and I3. The depth level is changed according to the changing location of the object 10, and the controller 180 informs the user of the depth level of the object by changing the sections of the indicator 51.

Figure 22:
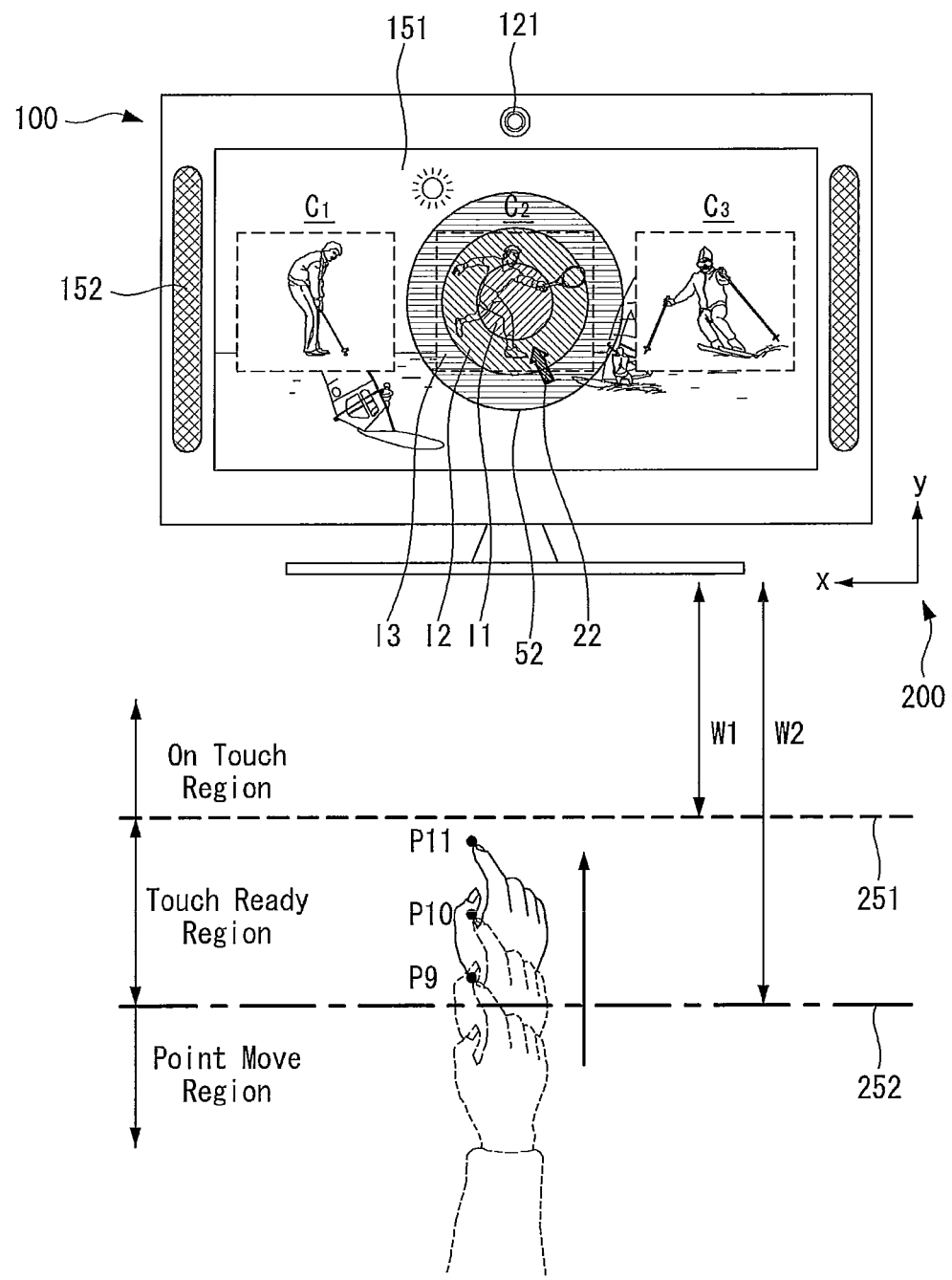

When the depth level of the object 10 with respect to the camera or display device is changed in the touch read region, the controller 180 may change an image of a predetermined area corresponding to concentric circles I1, I2, and I3 having a predetermined diameter from a position of the cursor 22 displayed on the display unit 151 as shown in FIG. 22. For example, when the object 10 approaches the virtual touch screen 251 from the touch ready region, the depth level of the object become smaller. Accordingly, the size of the concentric circles I1, I2, and I3 formed on the cursor 22 may be changed as shown in FIG. 22. Furthermore, a color of the concentric circle(s) I1, I2, and I3 may be changed with the size thereof in order to emphasize that the object 10 becomes further closer to the on touch region.

The number of concentric circles may increase in proportional to the number of movements of the object 10 in the touch read region.

As shown in FIGS. 21 and 22, since the visual information varies according to the movement of the user's hand, the user is visually informed as to the exact depth region that the user's hand is currently positioned. As such, the user can enter into the virtual touch screen by extending his or her arm little when the object 10 makes a predetermined gesture in the touch-ready region. Accordingly, it is possible to effectively control the display device based on gesture recognition. The user may prepare to accurately make a push gesture to a predetermined position in the virtual touch screen 251 based on the feedback information, e.g., the visually provided feedback information.

When the controller 180 determines that the object 10 enters the on-touch region based on the obtained depth level at step S430, the controller 180 may select an item C2 indicated by the object or perform an event related to the item C2.

The event related to the item C2 may be an event that executes an application program if the item C2 is the application program.

The event may be an event that select the item C2 and moves the selected item C2.

The event may be varied according to a predetermined gesture made by the object in the on-touch region.

Figure 23:
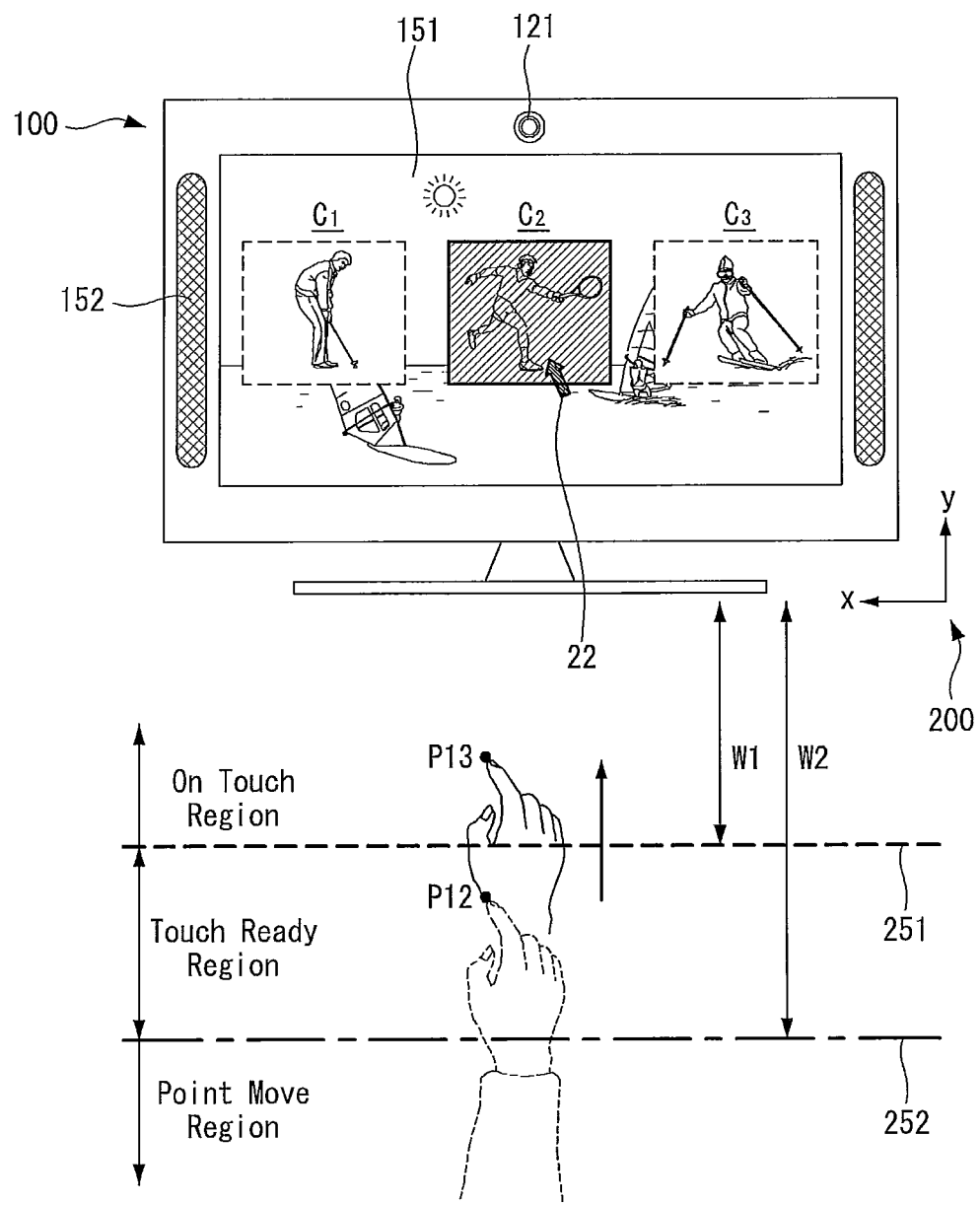

For example, when the object 10 enters the on touch region P13 from the touch-ready region P12 by changing a depth level thereof as shown in FIG. 23, the controller 180 recognizes the movement of the object 10 as a touch input of selecting a predetermined item C2 displayed on the display unit 151 where the cursor 22 is. As the object 10 provides gesture(s) with the item C2 selected, function(s) associated with the gesture(s) are performed, such as moving the selected out, zooming-in/out the selected item, etc.

When the object 10 moves back to the touch-ready region P12 from the on-touch region P13 after selecting the item C2, the controller 180 may recognize the movement of the object 10 as an input for performing an event of the item C2.

When the object 10 makes a gesture of grabbing the item C2 after entering into the on-touch region P13, the controller 180 may perform the item C2 corresponding to the grab gesture.

Further, the controller 180 may perform the item C2 when the object 10 makes a gesture of double tapping the item C2. Grabbing or doubling tapping the item C2 are merely examples of a gesture that causes a function/event of the selected item to be performed.

In general, a typical touch screen may recognize a touch when an object makes one tapping, double tapping, dragging, or dragging and dropping. However, in the present embodiment, the virtual touch screen 251 may be formed based on a distance from the display device 100 and the object 10 or the depth level of the object, instead of directly touching the display unit 151. Such depth level of the object may be obtained through a camera. Various gestures made by the object within the distance (or depth level) corresponding to the virtual screen 251 correspond to various touch inputs made to the touch screen as described above.

The controller 180 may inform a user that the item C2 is selected by visually changing the appearance of the selected item C2. That is, at least one of a size, a color, a shape, and animation of the selected item may be changed.

Figure 24:
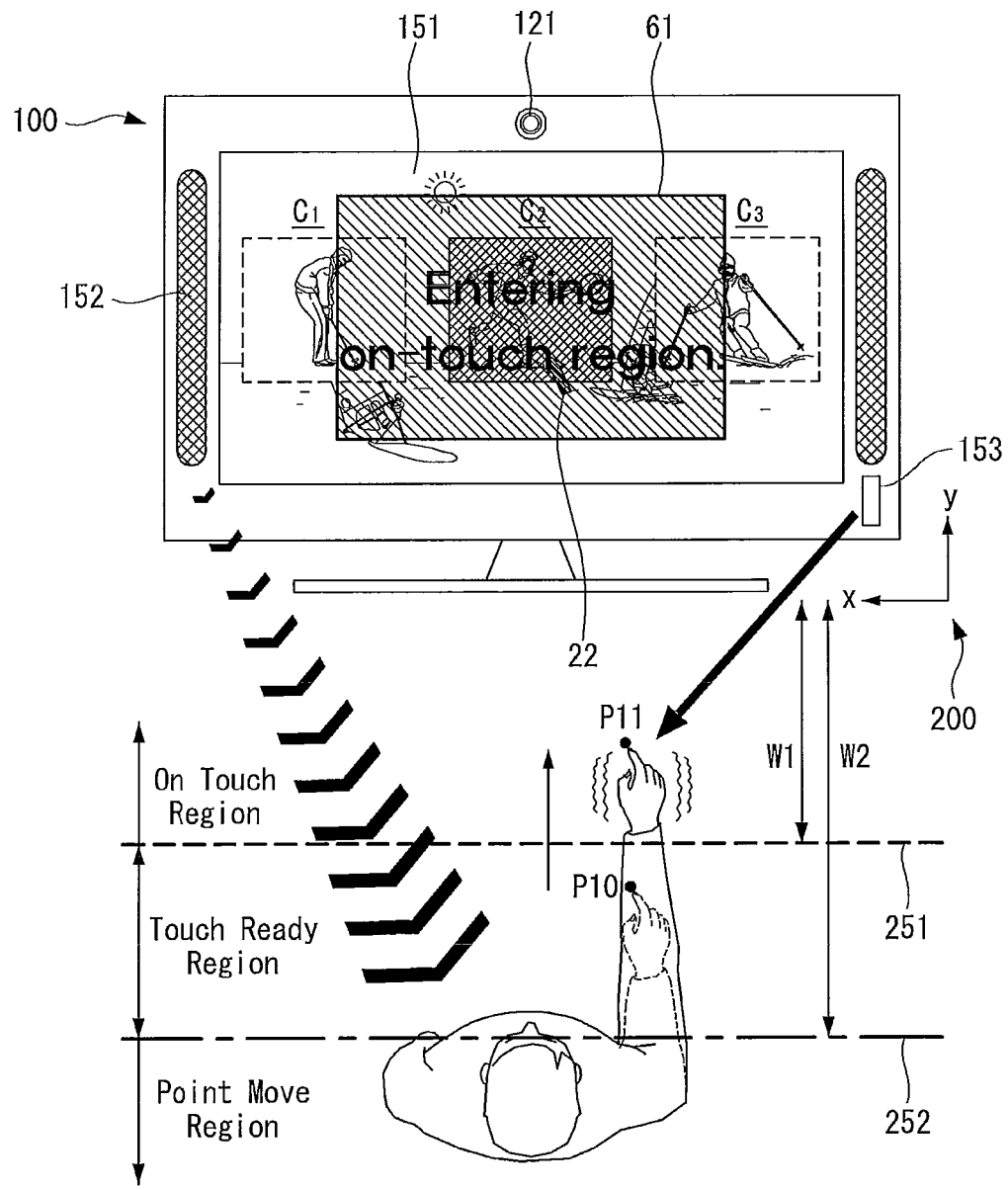
FIG. 24 is a diagram for describing a method for providing a feedback according to changes of a distance from a display device 100 to a finger tip that makes a push gesture according to an embodiment of the present invention.

FIG. 24 is a diagram for describing a method for providing a feedback according to a change in a distance from a display device 100 to a finger tip that makes a push gesture.

Referring to FIG. 24, when the object 10 enters the on-touch region from the touch-ready region (inside the virtual touch screen 251), the controller 180 may provide a feedback to a user for information that the object 10 enters the virtual touch screen 251. Various methods may be used for providing a feedback to a user, such as providing at least one of visual indication, acoustic indication and tactile sense indication to the use. For example, a color or a size of the cursor 22, which is displayed a predetermined position on the display unit 151 corresponding to a coordinate of the object, may be changed. Furthermore, at least one of the color and the size of the cursor 22 may be changed when a push length of the object 10 increases.

For example, an audio feedback may be provided by providing a predetermined sound effect pattern through the speaker 152.

For another example, a visual feedback may be provided by displaying a guide window 61 on the display unit 151 for informing a user of a region where the object 10 is currently located.

For another example, a tactile sense feedback may be provided by transferring a predetermined vibration pattern to a predetermined body part of a user using the vibration module 153. The predetermined vibration pattern has a predetermined frequency causing the user to feel vibration by a predetermined pressure. As mentioned above, one or more different feedbacks can be provided to the user depending on the location of the object 10 with respect to the camera, and at certain location of the object, no feedback may be needed.

As described above, various feedback signal patterns can be provided to a user based on interactions with the display device 100. Accordingly, the user may determine intuitively which region a hand of the user is located.

It was described that the controller 180 provides various feedbacks to a user according to which region the object 10 is located. However, the present invention is not limited thereto. That is, the controller 180 may provide feedback(s) according to a selection made to a predetermined item displayed on the display unit 151 corresponding to the predetermined movement of the object although the controller 180 provides a feedback according to the distance to the object 10.

Figure 25:
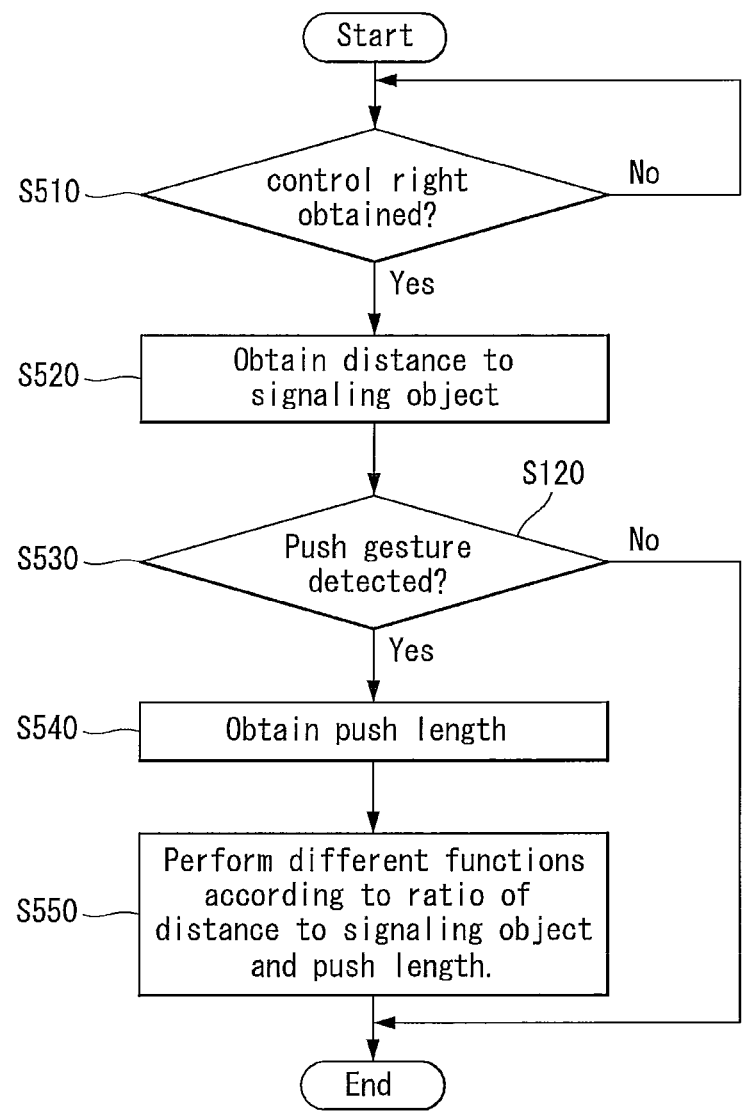
FIG. 25 is a flowchart that illustrates a method for controlling a display device according to the fifth embodiment of the present invention.
Figure 26:
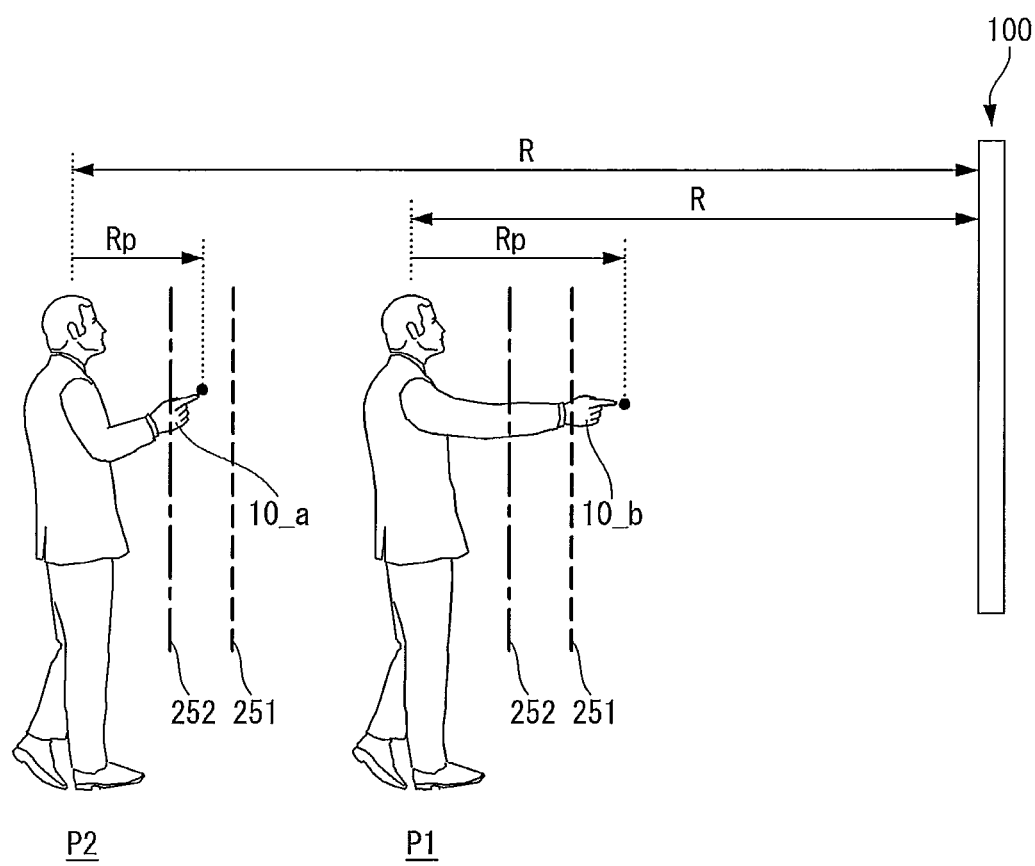
FIG. 26 is a diagram for describing the method for controlling a display device according to the fifth embodiment of the present invention.

FIG. 25 is a flowchart that illustrates a method for controlling a display device according to the fifth embodiment of the present invention. FIG. 26 is a diagram for describing the method for controlling a display device according to the fifth embodiment of the present invention. The control method is performed under the control of the controller 180.

When a region between the object 10 and the display device 100 is divided into a plurality of virtual regions, a push gesture made by the object may be in at least one of the plurality of virtual regions. The display device may perform different functions according to which region the object is located and/or the movement of the object.

The location of the object 10 may be changed. That is, the object 10 could become closer to or farther from the display device 100. When the location of the object 10 is changed, a range of the virtual region should be changed accordingly. It is because a push length made by a push gesture differs according to a length of an arm when the object is a human.

For example, when the distance between the object and the display device 100 is about 5 m, a region separated from the object 10 at about 1 m may be defined as an outside region of the virtual touch screen 251. Also, a region separated from the outside region at about 4 m is defined as an inside region of the virtual touch screen 251. When a distance between the object 10 and the display device 100 is changed to about 4 m, a region separated from the display device at about 3 m is defined as the inside region of the virtual touch screen 251 although the outside region of the virtual touch screen 251 may be identically defined.

Accordingly, the input of the virtual touch screen 251 is controlled in consideration of a ratio of a push length of a push gesture and a distance between the display device 100 and the object 10 in the present embodiment.

At step S510, the controller 180 obtains a control right of controlling the display device 100. At step S520, the controller 180 obtains a distance to the object 10.

When the object 10 makes a push gesture at step S530, the controller 180 obtains a push length of the push gesture at step S540.

Referring to FIG. 26, the display device 100 may obtain a distance Rh from the display device 100 to a finger tip of user's arm extending toward the display device 100 when the user makes the push gesture. The push length Rp may be a difference between a distance R between the display device 100 and the object 10 and the distance Rh between the display device 100 and the finger tip.

After obtaining the push length Rp, the controller 180 may perform different functions according to a ratio of the distance R and the push length Rp (for example, Rp/R) at step S550.

As shown in FIG. 26, the memory 160 of the display device 100 may store a plurality of virtual region ranges mapped to the ratios of the distance R and the push length Rp (for example, Rp/R). For example, when the distance R to the object is about 3 m with an assumption that a length of an arm is about 1 m and when the ratio (Rp/R) is greater than about 0.03 and smaller than about 0.1 (0.03<Rp/R<0.1), controller 180 determines that the object 10 is located in the outside region of the virtual touch screen 251. When the ratio is greater than about 0.1 (Rp/R>0.1), the controller 180 determines that the object 10 is located inside the virtual touch screen 251. However, the ratio may be changed according to a distance from the display device 100 and the object 10. That is, the ratio becomes smaller as the distance from the display device 100 and the object 10 becomes longer.

Although the distance from the display device 100 to the object 10 is changed, the display device can be effectively controlled using the virtual touch screen without requiring additional operations to a user by newly setting a location of the virtual touch screen 251 as described above.

However, the controlling method according to the present invention is not limited to the above described embodiments. For example, a maximum push length Rp may be about 1 m under an assumption that a length of user's arm is about 1 m. Accordingly, when the push length (Rp) is smaller than about 30 cm and greater than about 10 cm (10 cm<Rp<30 cm), the controller 180 may determine that the object is located in the outside region of the virtual touch screen 251. When the push length Rp is greater than about 30 cm, the controller 180 may determine that the object enters the virtual touch screen 251. That is, the same effect of the above described embodiment can be obtained using the push length of the object.

It is to be understood that the invention is not limited to the disclosed embodiments, but, on the contrary, is intended to cover various modifications and equivalent arrangements included within the spirit and scope of the appended claims. For example, a method for controlling a display device according to the present invention may be implemented by software. When it is implemented by software, constituent elements of the present invention may be program codes or code segments that perform necessary tasks. The program codes or the code segments may be stored in a processor readable medium or transmitted by a computer data signal combined with a carrier wave in a transmission medium or a communication network.

The invention can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising:
   a camera;
   a display unit configured to display at least one item; and
   a controller configured to control the display unit, to assign a control right to an external object, and to assign a depth relationship between the external object and the camera of the display device in response to gestures made by the external object, each gesture having a start point and an end point that is different from the corresponding start point,
   wherein the depth relationship is a distance between the external object and the camera,
   wherein the depth relationship comprises at least a first depth range, a second depth range and a third depth range, the first depth range being equal to or less than a predetermined distance from the camera, the second depth range being greater than the predetermined distance from the camera, and the third depth range being farther than the second depth range, the second depth range being positioned between the first depth range and the third depth range, wherein the controller is configured to:
recognize the external object being entered into the third depth range and move a cursor on the display unit according to a movement of the external object in the third depth range,
display notification information indicating the external object is located inside the second depth range on the display unit, in response to recognizing a first push gesture of the external object from the third depth range toward the second depth range, and an item indicated by the cursor not being selected by the first push gesture,
select the item indicated by the cursor in response to recognizing a second push gesture of the external object from the second depth range toward the first depth range, and
perform an event corresponding to the selected item in response to recognizing moving of the external object from the first depth range toward the second depth range after the item is selected.

2. The display device of claim 1, wherein once a selection ready mode of the external object has been set and when the depth relationship indicates that a current depth between the external object and the camera falls within the first depth range, the controller recognizes a new gesture of the external within the first depth range as an operation for controlling a specific function of the display device and performs the specific function according to the new gesture if the external object.

3. The display device of claim 2, wherein when the external object moves from the first depth range to the second depth range after the new gesture of the external object makes a selection of the specific function within the first depth range, any gesture of the external object within the moved second depth range further controls the selected function.

4. The display device of claim 1, wherein the camera is integrated into the display device.

5. The display device of claim 1, wherein the controller performs a first function when the depth relationship indicates that a current depth between the external object and the camera falls within the first depth range,
the controller performs a second function when the depth relationship indicates that a current depth between the external object and the camera falls within the second depth range longer than the first depth range, and
the controller performs a third function when the depth relationship indicates that a current depth between the external object and the camera falls within a third depth range longer than the second depth range.

6. The display device of claim 5, wherein the second function includes a function of changing an image of a predetermined area corresponding to a location of a cursor displayed on the display unit.

7. The display device of claim 6, wherein the predetermined area is an area corresponding to a concentric circle having a predetermined diameter with the location of the cursor as a center.

8. The display device of claim 1, wherein the controller performs at least one predetermined function according to a ratio of the depth relationship and a push length, where the push length is a length corresponding to a push gesture of the external object.

9. The display device of claim 1, wherein if the external object is in the second depth range, the display device is in a selection ready mode and no item currently displayed on the display unit is movable by a gesture of the external object in the selection ready mode.

10. The display device of claim 1, wherein the controller is further configured to:
continuously display, on the display unit, at least one indicator indicating a current depth range of the external object as the external object moves in the second depth range with respect to the camera.

11. The display device of claim 10, wherein the at least one indicator indicates how close the external object in the second depth range is with respect to entering the first depth range.

12. A method for controlling a display device including a camera, a display unit and a controller, the method comprising:
assigning, by the controller of the display device, a control right to an external object;
assigning, by the controller, a depth relationship between the external object and the camera of the display device in response to gestures made by the external object, each gesture having a start point and an end point that is different from the corresponding start point,
wherein the depth relationship is a distance between the external object and the camera, and
wherein the depth relationship comprises at least a first depth ranger, a second depth range and a third depth range, the first depth range being equal to or less than a predetermined distance from the camera, the second depth range being greater than the predetermined distance from the camera, and the third depth range being farther than the second depth range, the second depth range being positioned between the first depth range and the third depth range;
recognizing the external object being entered into the third depth range and moving a cursor on the display unit according to a movement of the external object in the third depth range;
displaying notification information indicating the external object is located inside the second depth range on the display unit, in response to recognizing a first push gesture of the external object from the third depth range toward the second depth range, and an item indicated by the cursor not being selected by the first push gesture;
selecting the item indicated by the cursor in response to recognizing a second push gesture of the external object from the second depth range toward the first depth range; and
performing an event corresponding to the selected item in response to recognizing moving of the external object from the first depth range toward the second depth range after the item is selected.

13. The method of claim 12, further comprising performing a first function when the depth relationship indicates that a current depth between the external object and the camera falls within the first depth range,
performing a second function when the depth relationship indicates that a current depth between the external object and the camera falls within the second depth range longer than the first depth range, and
the method further comprises performing a third function when the depth relationship indicates that a current depth between the external object and the camera falls within a third depth range longer than the second depth range.

14. The method of claim 12, wherein in the selection ready mode, no item currently displayed on the display unit is movable by a gesture of the external object.

15. The method of claim 12, further comprising:
continuously displaying, on the display unit, at least one indicator indicating a current depth range of the external object as the external object moves in the second depth range with respect to the camera.

16. The method of claim 15, wherein the at least one indicator indicates how close the external object in the second depth range is with respect to entering the first depth range.

* * * * *